US005740977A

United States Patent [19]
Kaya

[11] Patent Number: 5,740,977
[45] Date of Patent: Apr. 21, 1998

[54] PHOTO FILM CASSETTE HAVING ASSEMBLY CHARACTERISTICS

[75] Inventor: Akimasa Kaya, Kanagawa, Japan

[73] Assignee: Fuji Photo Film Co., Ltd., Kanagawa, Japan

[21] Appl. No.: 579,199

[22] Filed: Dec. 27, 1995

[30] Foreign Application Priority Data

Dec. 27, 1994 [JP] Japan ................................ 6-324482

[51] Int. Cl.$^6$ .................................................. G03C 3/00
[52] U.S. Cl. .................. 242/348.3; 242/348.4; 242/357; 396/512; 396/514
[58] Field of Search ................ 242/348, 348.1, 242/348.3, 348.4, 357; 354/275; 396/511, 512, 513, 514, 515

[56] References Cited

U.S. PATENT DOCUMENTS

| | | |
|---|---|---|
| 4,834,306 | 5/1989 | Robertson et al. |
| 5,174,519 | 12/1992 | Oi et al. |
| 5,271,577 | 12/1993 | Takahashi et al. |
| 5,296,887 | 3/1994 | Zander . |
| 5,317,355 | 5/1994 | Zander et al. .............. 242/348.4 X |
| 5,363,166 | 11/1994 | Takahashi et al. .......... 242/348.4 X |
| 5,407,146 | 4/1995 | Takahashi et al. .......... 242/348 |
| 5,450,150 | 9/1995 | Smart et al. ................. 354/275 X |
| 5,499,781 | 3/1996 | Reinke ........................ 354/275 X |
| 5,522,563 | 6/1996 | Earnhart et al. ............ 242/348 |

FOREIGN PATENT DOCUMENTS

| | | |
|---|---|---|
| 654049 | 4/1965 | Belgium . |
| 62-284355 | 12/1987 | Japan . |
| 62-286043 | 12/1987 | Japan . |

*Primary Examiner*—Daniel P. Stodola
*Assistant Examiner*—William A. Rivera
*Attorney, Agent, or Firm*—Sughrue, Mion, Zinn, Macpeak & Seas, PLLC

[57] ABSTRACT

A photo film cassette has photo film (12) contained in a roll form. The photo film is advanced to an outside of a cassette shell (11) when a spool core (26) is rotated in an unwinding direction. Two flexible flanges (27, 28) are secured to the spool core, and render edges of the photo film neat. Bearing holes (27a, 28a) are formed respectively in a middle of the flanges, for insertion of the spool core. The first bearing hole (27a) in the first flange (27) has a first diameter $\phi H$. A first stopper ring (67) is associated with the first flange, for preventing the first flange from being moved away from the photo film. The first stopper ring has a second diameter. A receiving region lies between the first stopper ring and a second stopper ring (65), contacted on the edge of the first bearing hole in the first flange supported in the receiving region, for preventing the first flange from being moved toward the photo film. A circumference of the spool core includes at least first and second sections ($\theta 1$, $\theta 3$). The second stopper ring includes a first sector portion (65a), disposed in the first section ($\theta 1$) about the spool core, and having a third diameter $\phi d$ meeting $\phi d > \phi H$. A second sector portion (65b) is disposed in the second section ($\theta 3$) about the spool core, and has a fourth diameter $\phi D$ meeting $\phi D > \phi d$. The fourth diameter $\phi D$ is smaller than the second diameter of the first stopper ring.

19 Claims, 15 Drawing Sheets

F I G. 16
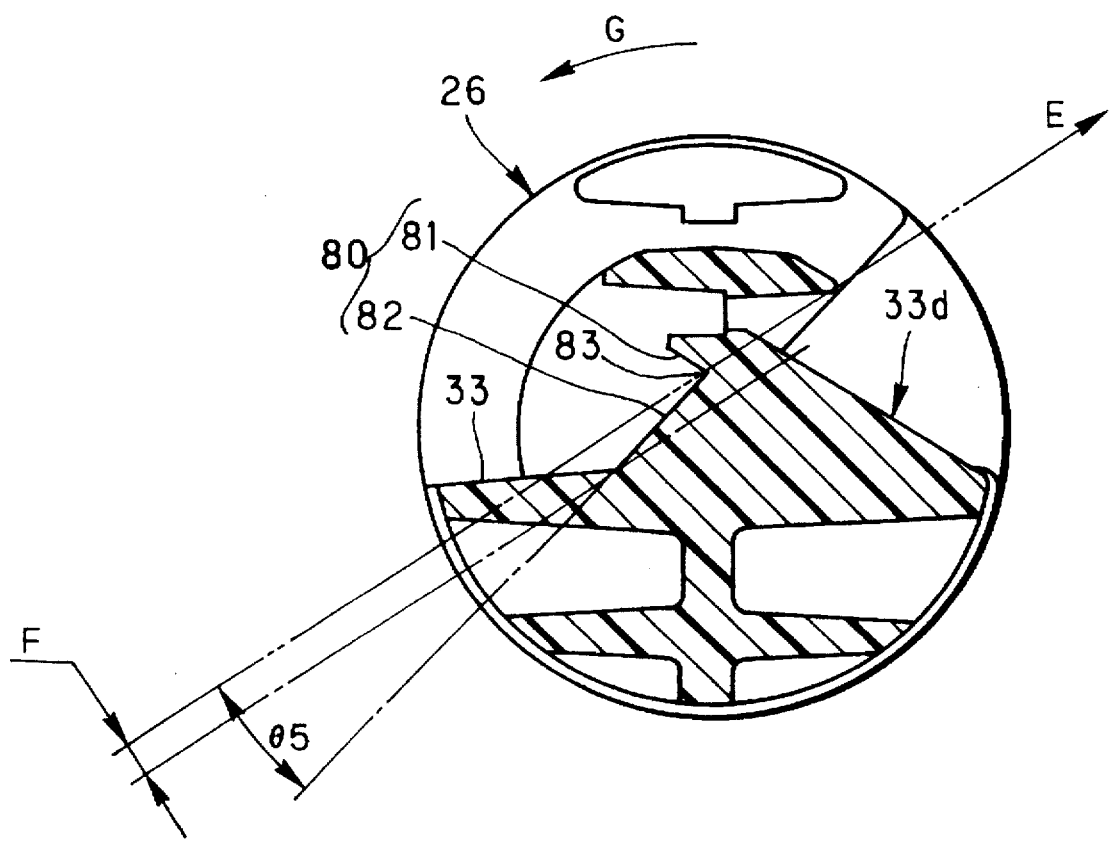

PHOTO FILM CASSETTE HAVING ASSEMBLY CHARACTERISTICS

BACKGROUND OF THE INVENTION

1. Field of the Invention

The present invention relates to a photo film cassette. More particularly, the present invention relates to a photo film cassette of which a leader of photo film is advanced when a spool is rotated in an unwinding direction.

2. Description Related to the Prior Art

There is a photo film cassette of a leader-advancing type as disclosed in U.S. Pat. No. 4,834,306 and 5,296,887 and commonly assigned U.S. Pat. No. 5,174,519, 5,271,577 and 5,407,146. In this type, a photo film is pre-contained in a cassette shell. When a spool is rotated in an unwinding direction, a leader of the photo film is advanced to the outside of the cassette. It is also known to use the same structure as a container for containing a developed photo film, for the purpose of facilitating the handling and preservation of the photo film.

The photo film cassette has a mechanism for advancing the photo film at the time of rotation of the spool. The photo film advancing mechanism includes a separator claw and a pair of flanges. The flanges are secured rotatably to a spool core contained in the cassette shell in rotatable fashion, and contact edges of the photo film in the photo film width direction. The inside of the cassette has the separator claw, which is adapted to separating the photo film leader and directs it to a photo film passage port away from the spool core.

The pair of the flanges are formed of plastic material having flexibility, and shaped like a shallow vessel. Each of the flanges has a bearing hole in the center, for insertion of a spool core. Each of the flanges has a ring-like lip formed integrally with its periphery and projected toward an opposite one of the flanges. When the spool core is rotated in the unwinding direction, the ring-like lips cover ends of the outermost turns of the photo film roll, transmit rotation of the spool core to the photo film, and keep the photo film from being loosened.

To advance the photo film, the spool is rotated in a direction of unwinding the photo film. A distal end of the leader is contacted on, and separated by, a separator claw toward the photo film passage port. The flanges are flexible, and spread by the edges of the photo film. The roll of the photo film is released from being covered by the ring-like lips in the vicinity of the photo film port.

The photo film cassette of this type is also adapted to containing undeveloped photo film and to containing developed photo film. In a photo laboratory, the photo film is drawn from the cassette in an undeveloped exposed status. The trailer has been retained on the spool, and must be separated from the spool after the drawing. In the photo laboratory, an operator or a machine also effects operation of rewinding the developed photo film back into the cassette. If the photo film is cut away from the spool across the trailer, a piece of a trailing end of the photo film remains on the spool, and thus the cassette cannot be reused. It is necessary to disengage the trailer from the spool without a cutting operation.

A structure adapted to facilitation in removal of the photo film from the spool is disclosed in a commonly assigned JP-A 6-266054 (corresponding to EP-A 0 615 153). A slot is formed through the spool core for insertion of a trailer of the photo film. An upper wall of the slot is cut into two flaps. Two contact ridges are resiliently formed respectively on free ends of the flaps. A lower wall of the slot is provided with retaining claws located outside the contact ridges. When the trailer is inserted in the slot, two retaining holes formed in the trailer of the photo film are retained on the retaining claws. The trailer is secured to the spool core. The ridges press the trailer to prevent the retaining claws from accidental disengagement from the retaining holes.

The operation of the photo film separation is disclosed in a commonly assigned JP-A 6-35123 (corresponding to EP-A 0 582 852). An arcuate guide plate is inserted through the passage port and into the spool core. The contact ridges are flexed, while the trailer is disengaged from the spool automatically. The trailer thus can be separated from the spool without being cut. A conveyer in a photo film processor conveys the photo film to the inside of the photo film processor. After the development and the printing, the photo film is conveyed with the trailer directed ahead. Another guide plate is used for the photo film mounting, and has a claw for engagement with the trailer. The trailer with the guide plate is inserted into the cassette shell, flexes the contact ridges, and engages the retaining holes with the retaining claws while flexing the contact ridges. Then the spool is rotated in the winding direction. The photo film is thus entirely contained in the cassette shell.

The photo film cassette includes a considerable number of parts. Both ease of assembly and durability in the assembly are desired for those parts. This applies to mounting of the flanges on the spool. The flange is shaped like a shallow vessel, and is thin and flexible. If the ring-like lip is depressed in the direction from an outer face toward an inner face of the flange, it is likely that the bearing hole is spread with resiliency toward the outer face, and that the flange is disengaged from the flange support. In such a case is impossible to advance the photo film to the outside. If the flange is disengaged toward the roll of the photo film, the photo film may be scratched.

There is possibility of an accident in operation of photo film separation. A photo film processor draws the exposed photo film nearly fully out of the cassette shell, and detects load from the photo film. The drawing of the photo film is once stopped. Force in the direction toward the photo film passage port is being applied to the trailer as retained. Due to great tension applied to rear edges of the retaining holes contacted on the retaining claws, curling occurs in a distal rear end of the photo film behind the retaining holes. The trailer is loosely raised from the support of each retaining claw, as the distal rear end of the trailer inevitably contacts the support of the retaining claw. The retaining holes are incidentally released from retention on the retaining claws of the spool. If a guide plate is inserted, the trailer is scratched or damaged. The trailer in the free state may be somewhat resistant to the insertion of the guide plate, to cause difficulties to the guide plate and its associated mechanism for plate movement.

SUMMARY OF THE INVENTION

In view of the foregoing problems, an object of the present invention is to provide a photo film cassette in which flanges of a spool can be secured to a spool core with great easiness, and can be reliably prevented from being disengaged accidentally from the spool core.

Another object of the present invention is to provide a photo film cassette in which a trailer of photo film can be prevented from being removed from a spool when nearly all the photo film is drawn out of the photo film cassette in a photo film separating operation.

In order to achieve the above and other objects and advantages of this invention, first and second flanges are flexible and secured respectively to first and second axial ends of the spool core, for regulating positions of edges of the photo film. There are first and second circular bearing holes which are formed respectively in a middle of the first and second flanges, and through which the spool core is inserted, the first bearing hole having a first diameter. At least one ring-like lip is formed integrally with a periphery of the first and/or second flanges, projected toward the roll of the photo film, contacted on an edge of an outermost turn of the roll, for preventing the roll from being loosened. A first stopper ring is disposed near to the first axial end of the spool core, projected from the spool core in radial fashion, contacted on an edge of the first bearing hole in the first flange supported in a receiving region of the spool core, for preventing the first flange from being moved away from the receiving region and toward the first axial end, the first stopper ring having a second diameter. A second stopper ring is disposed opposite to the first stopper ring in relation to the receiving region, projected from the spool core in radial fashion, contacted on the edge of the first bearing hole in the first flange supported in the receiving region, for preventing the first flange from being moved away from the receiving region and toward the first axial end, wherein the first flange is moved past the second stopper ring toward the first axial end, to be mounted on the receiving region. A periphery of the spool core includes at least first and second sections. The second stopper ring includes a first sector portion, disposed in the first section about the spool core, and having a third diameter greater than the first diameter. A second sector portion is disposed in the second section about the spool core, and has a fourth diameter greater than the third diameter, the fourth diameter being smaller than the second diameter of the first stopper ring.

In the present invention, the flanges of the spool can be secured to the spool core with ease, and can be reliably prevented from being disengaged accidentally from the spool core.

In a preferred embodiment, a slot is formed in the spool core, and extends in a longitudinal direction thereof for inserting the trailer, the slot having first and second walls. The photo film includes at least one retaining hole, formed in the trailer. At least one retaining claw is formed inside the slot to project from the first wall, fitted in the retaining hole, for retaining the trailer in the slot. A retaining face is formed on the retaining claw, confronted in a rotational direction of winding the photo film about the spool core, for preventing the trailer from moving toward the passage port when the photo film is unwound. A support face is formed on the first wall and in connection with the retaining face, and disposed in an angular V-shape relative to the retaining face, the support face satisfying the following relationship $$3° \leq \theta5 \leq 20°$$

where θ5 is an angle at which the support face is inclined in the winding rotational direction relative to a first line, the first line being defined by the trailer extended between the spool core and the passage port when the photo film is unwound substantially entirely. At least one resilient contact ridge is formed inside the slot to project from the second wall, for preventing the trailer from removal from the retaining claw.

The trailer of the photo film can be prevented from being removed from a spool when nearly all the photo film is drawn out of the photo film cassette in a photo film separating operation.

BRIEF DESCRIPTION OF THE DRAWINGS

The above objects and advantages of the present invention will become more apparent from the following detailed description when read in connection with the accompanying drawings, in which:

FIG. 16 is a cross section taken on line XVI—XVI in FIG. 8, illustrating the spool core.

DETAILED DESCRIPTION OF THE PREFERRED EMBODIMENTS OF THE PRESENT INVENTION

Figure 1:
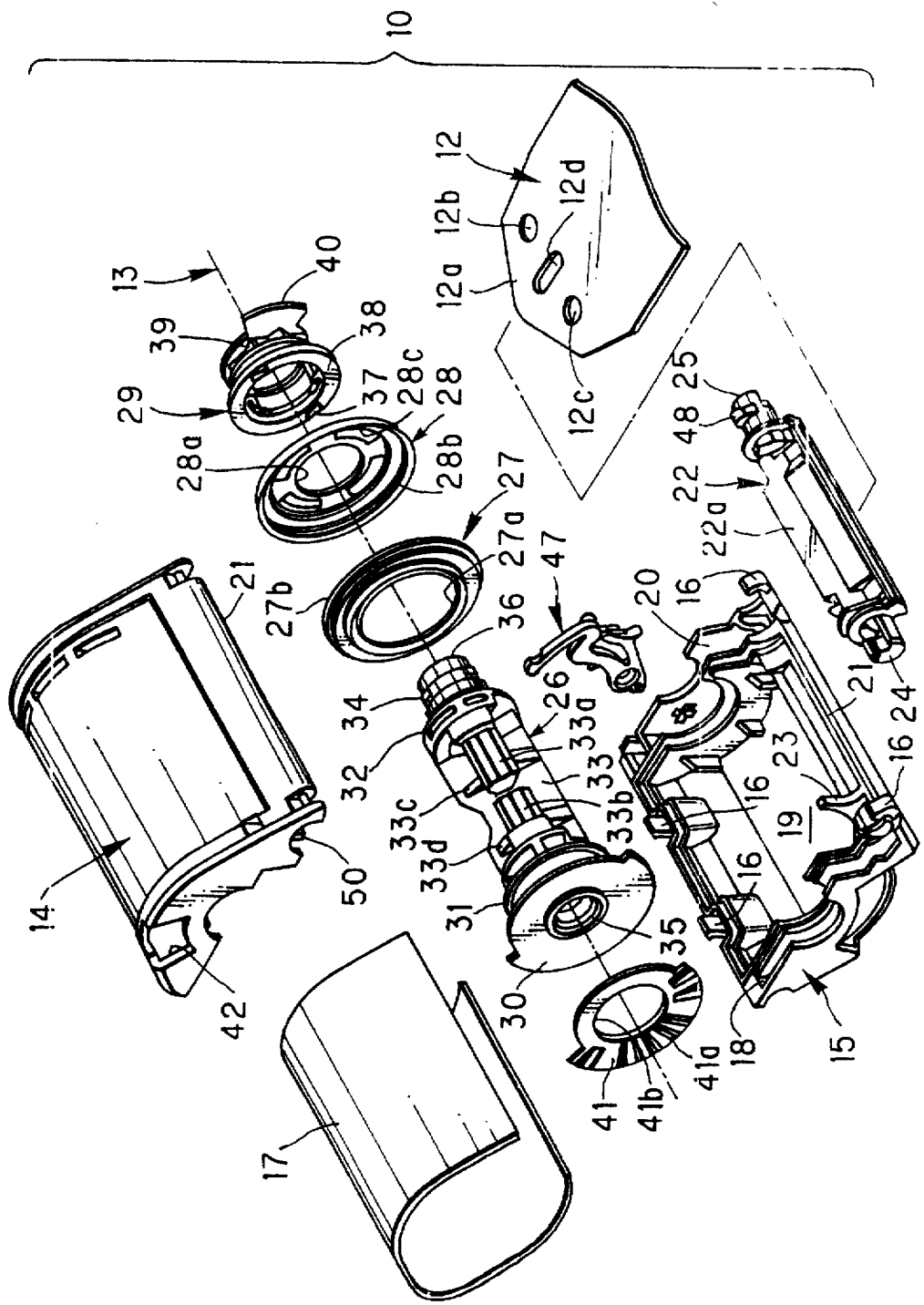
FIG. 1 is an exploded perspective view illustrating a photo film cassette.
Figure 2:
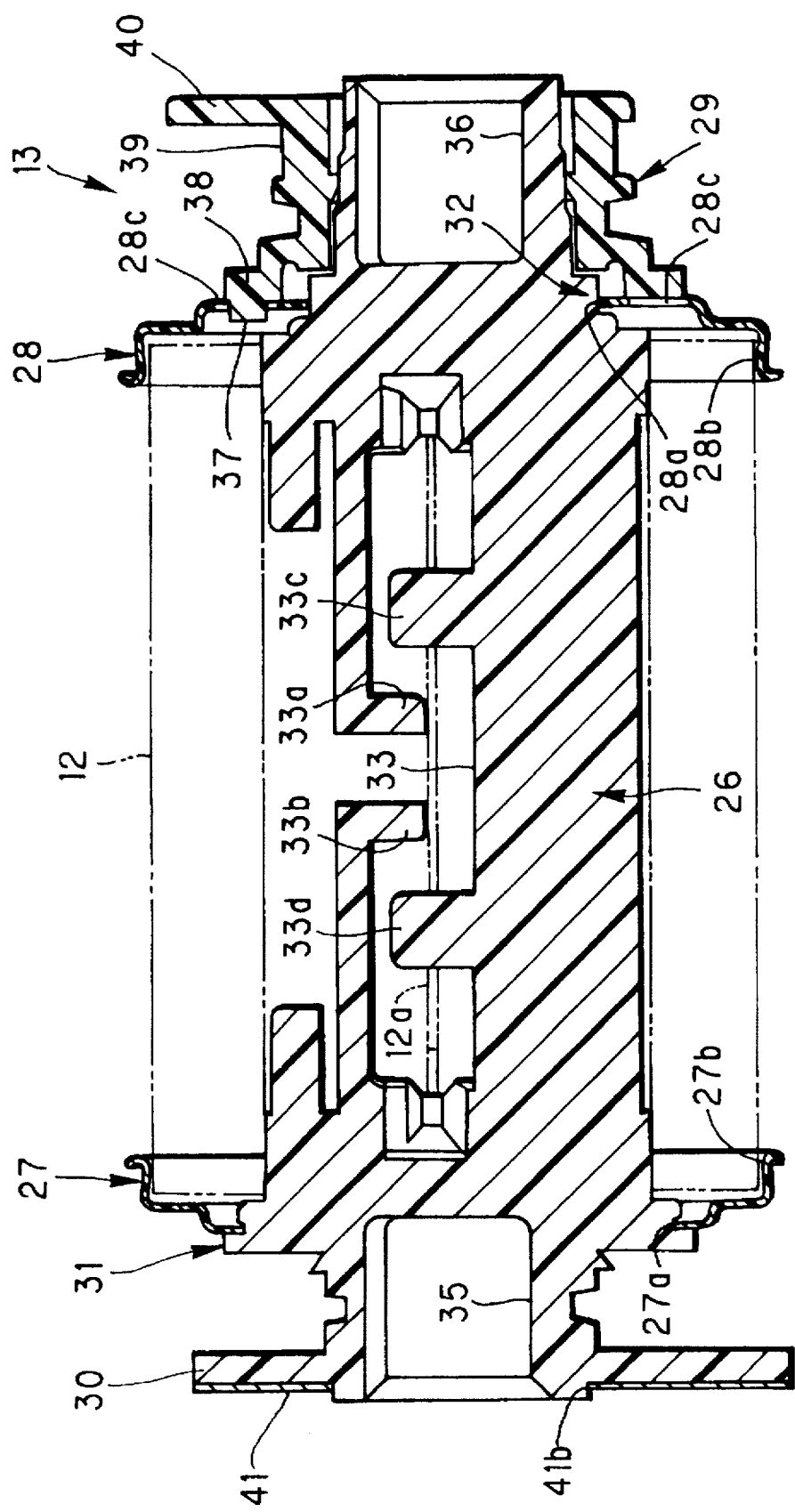
FIG. 2 is a horizontal section illustrating a spool core.

In FIGS. 1 and 2, a photo film cassette 10 has a cassette shell 11, in which a spool 13 is contained with photo film 12 wound thereabout. When the spool 13 is rotated in an unwinding direction, the photo film 12 is advanced to the outside of the cassette shell 11.

The cassette shell 11 consists of an upper shell half 14 and a lower shell half 15, each of which is formed from resin as a single piece. The spool 13, a shutter 22 and a spool lock 47 are placed between the shell halves 14 and 15, before the shell halves 14 and 15 are fitted together by retaining four hooks 16 of the lower shell half 15 to the upper shell half 14. Part of the juncture between the upper shell half 14 and the lower shell half 15 constitutes a photo film passage port 21 through which the photo film 12 is passed. The outside of the cassette shell 11 is provided with a sticker 17 on which indicia are printed.

The spool 13 includes a spool core 26, a pair of flanges 27 and 28, and a barrel member 29. The spool core 26 includes a data indicator plate 30, two flange supports 31 and 32 for the flanges 27 and 28, a slot 33 for retention of the photo film, a receiving portion 34 for the barrel member 29, and the keys 35 and 36, all of which are unified as a single piece. The keys 35 and 36 are connected to a driving shaft of a camera loaded with the photo film cassette 10. The driving shaft rotates to cause the spool core 26 to rotate. The barrel member 29 includes a disk 38 with ratchet claws 37, a gear 39 and an indicator plate 40, all of which are unified as single piece. The barrel member 29 is fitted on the spool core 26 and rotatable integrally with the spool core 26. The disk 38 stops the flange 28 from dropping away.

The flanges 27 and 28 are formed of plastic material, and shaped like a shallow vessel. The flange 27 has a relatively large bearing hole 27a, and the flange 28 has a smaller bearing hole 28a. The spool core 26 is inserted into both of the bearing holes 27a and 28a in a single direction. The bearing hole 27a is secured to the flange support 31 in rotatable fashion. The bearing hole 28a is disposed on the flange support 32 in rotatable fashion. The flanges 27 and 28 contact edges of the photo film 12.

The inside of the slot 33 for a trailer 12a of the photo film 12 has resilient contact ridges 33a and 33b and retaining claws 33c and 33d. The contact ridges 33a and 33b are resilient as formed on two flaps constituting an upper wall in the slot 33. Two retaining holes 12b and 12c formed in the trailer 12a of the photo film 12 are retained on the retaining claws 33c and 33d. The contact ridges 33a and 33b press the trailer 12a to prevent the retaining claws 33c and 33d from accidental disengagement from the retaining holes 12b and 12c. The photo film 12, with the trailer 12a secured, is wound about the spool core 26. In FIG. 1, an opening 12d is formed between the retaining holes 12b and 12c, for receiving insertion of a guide plate, which picks up the trailer 12a for the purpose of inserting the photo film 12 in the unexposed status in a factory, or in the developed status in a photo laboratory.

The inside of the cassette shell 11 is divided into an information chamber 18, a photo film roll chamber 19 and an indicator chamber 20. With the spool 13 inserted in the cassette shell 11, the photo film 12 with the flanges 27 and 28 is contained in the roll chamber 19, while the data plate 30 is contained in the information chamber 18, and the roll chamber 19 is contained in the indicator chamber 20.

The photo film cassette 10 has mechanisms for advancing the photo film 12, for loosening the photo film 12, for preventing ambient light from entry, for locking rotation of the spool 13, for locking a shutter 22, for automatic detection of the photo film type, and for external indication of the photo film status.

Figure 3:
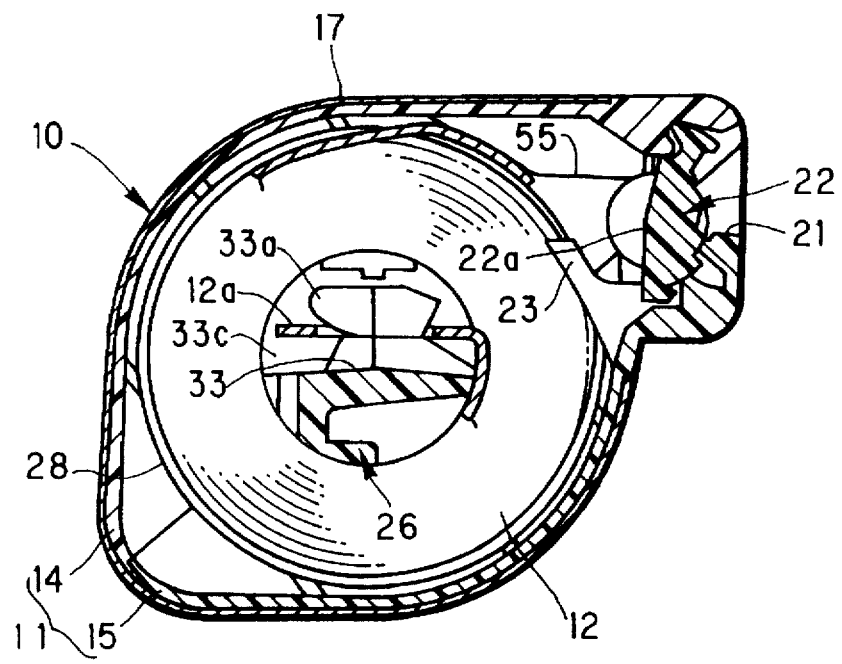
FIG. 3 is a cross section illustrating the cassette.
Figure 4:
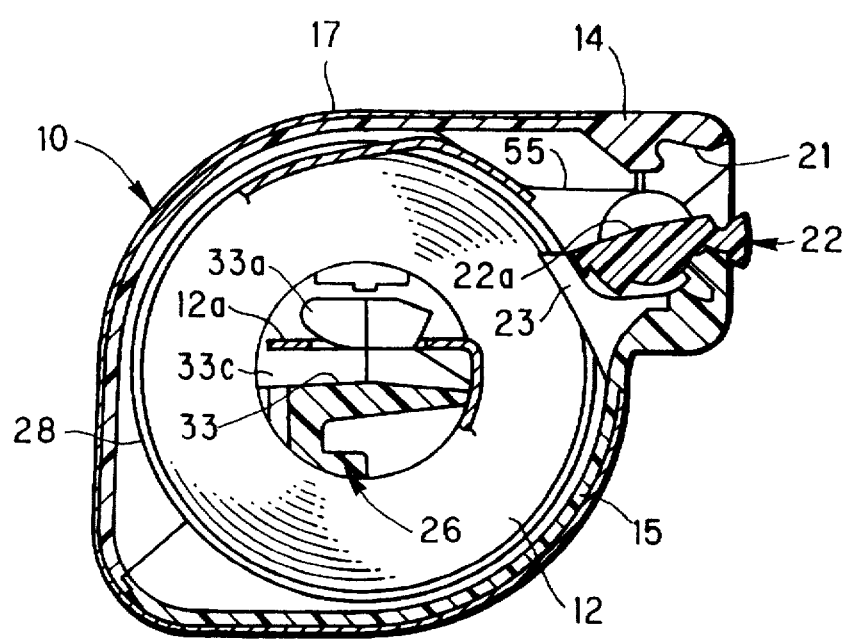
FIG. 4 is a cross section illustrating the cassette of which a shutter is open.

Ambient light is kept from entry by operation of the shutter 22, to protect the photo film 12 before exposure. The photo film passage port 21 has the shutter 22 closed to prevent ambient light from entry. Distal ends of a plate portion 22a of the shutter 22 have keys 24 and 25, which are C-shaped as viewed in section, and when the photo film cassette 10 is loaded into a camera, are connected to driving shafts for opening/closing the shutter 22. With the shutter 22 rotated, the shutter 22 is caused to have a position of FIG. 3 to open the photo film passage port 21, and a position of FIG. 4 to close the photo film passage port 21.

The photo film advancing mechanism includes a separator claw 23 and ring-like lips 27b and 28b. The photo film passage port 21 has the separator claw 23 for separating a leader of the film 12. The separator claw 23 is formed with the lower shell half 15. When the spool 13 rotates in the unwinding direction, the separator claw 23 separates the photo film leader and directs it to the passage port 21 from the roll chamber 19.

The flange 27 has the ring-like lip 27b formed integrally with its periphery. The flange 28 has the ring-like lip 28b projected toward the ring-like lip 27b. When the spool core 26 is rotated in the unwinding direction, the ring-like lips 27b and 28b cover ends of the outermost turns of the photo film roll, transmit rotation of the spool core 26 to the photo film 12, and keep the photo film 12 from being loosened. The ring-like lips 27b and 28b also operate for loosening the photo film 12.

The flange 28 on the other side is provided with four engaging openings 28c arranged in circular fashion around the bearing hole 28a. When the spool core 26 is rotated in the unwinding direction, one of the ratchet claws 37 of the barrel member 29 is engaged with the engaging openings 28c. The one of the ratchet claws 37 in engagement transmits rotation of the spool core 26 to the flange 28. When the spool core 26 is rotated in the winding direction (reverse to the unwinding direction), the ratchet claws 37 remain unengaged with the engaging openings 28c, to keep the flange 28 free from the rotation of the spool core 26. The flange 28 does not rotate during the winding of the photo film 12. The ring-like lip 28b slides in contact with the photo film 12, so that the photo film 12 is prevented from loosening.

The flanges 27 and 28 operate differently from each other. Should they be secured in reverse, the photo film 12 cannot be advanced. To avoid errors in the flange securing, the flange supports 31 and 32 for mounting the bearing holes 27a and 28a in the flanges 27 and 28 are differently shaped with uncommon diameters. The data plate 30 formed with the spool core 26 near to the flange support 31 has a diameter greater than the flange support 31. Accordingly the flanges 27 and 28 are commonly moved past a spool end opposite to the data plate 30.

To advance the photo film 12, the spool 13 is rotated in the unwinding direction. The photo film leading end, during the rotation of the spool core 26 in the unwinding direction, is directed toward the photo film passage port 21 by the separator claw 23. The leader of the photo film 12 is advanced to the outside of the cassette shell 11 while spreading the ring-like lips 27b and 28b resiliently. There is formed a notch 53 in a longitudinal edge of a leader 12e (See FIG. 7), to be engaged with the ring-like lip 28b, for protruding the leading end from the flanges 27 and 28 while nearly all the photo film 12 is contained in the cassette shell 11, for the purpose of facilitating the leader separation. There is formed a ridge 55 with the upper shell half 14 to protrude downward to the separator claw 23. The ridge 55 operates to press the photo film 12 to the inside of the ring-like lip 27b during the winding of the photo film 12.

Figure 5:
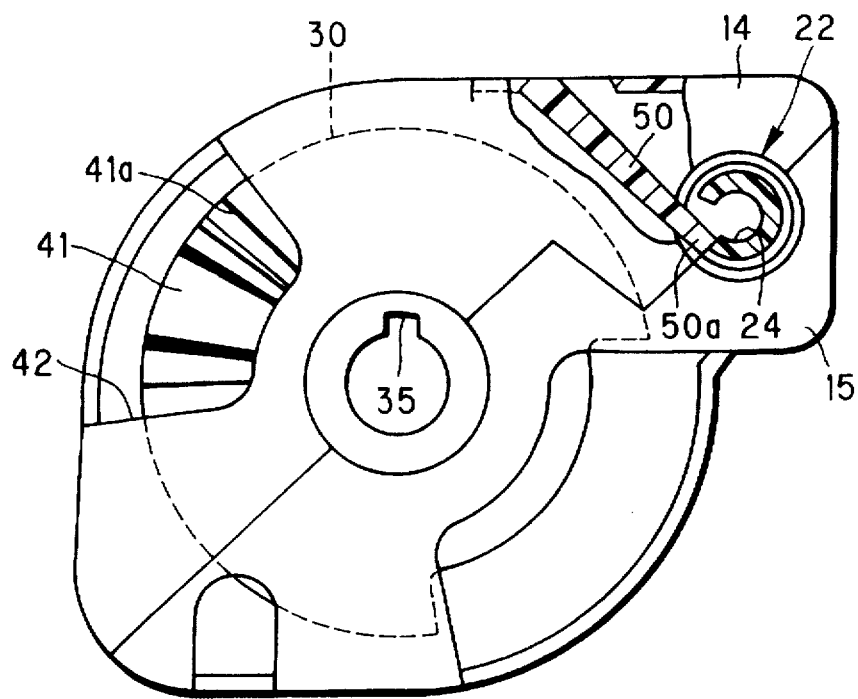
FIG. 5 is a left-hand side elevation, partly broken, illustrating the cassette.

To lock the shutter 22, there is formed a lock pawl 50 integrally with the upper shell half 14, as illustrated in FIG. 5. The lock pawl 50 has a distal end 50a, which, when the shutter 22 has the closed position, is inserted in a gap in the C-shaped end of the key 24, and hinders the shutter 22 from rotating to the open position. A driving shaft in a camera or the like to open/close the shutter 22 presses the distal end 50a outward through the gap in the key 24 when engaged with the key 24, so that the shutter 22 is unlocked and rendered rotatable to open/close.

In the mechanism for the photo film type detection, a bar code 41a is printed on a bar code sticker 41 on the data plate 30. The bar code 41a represents information inclusive of the type of the photo film, the photo film speed, the maximum photographable number of frames, and the like. The bar code 41a is read by a reading sensor in a camera or a photographic printer and while the spool 13 is rotated in an unwinding direction. The bar code 41a is accessed through an indicator opening 42 formed in the upper shell half 14. The bar code sticker 41 has a central circular hole 41b for positioning the bar code sticker 41 on the data plate 30 at a projected end of the spool core 26, for the purpose of heightening the precision of the position of the bar code sticker 41.

Figure 6:
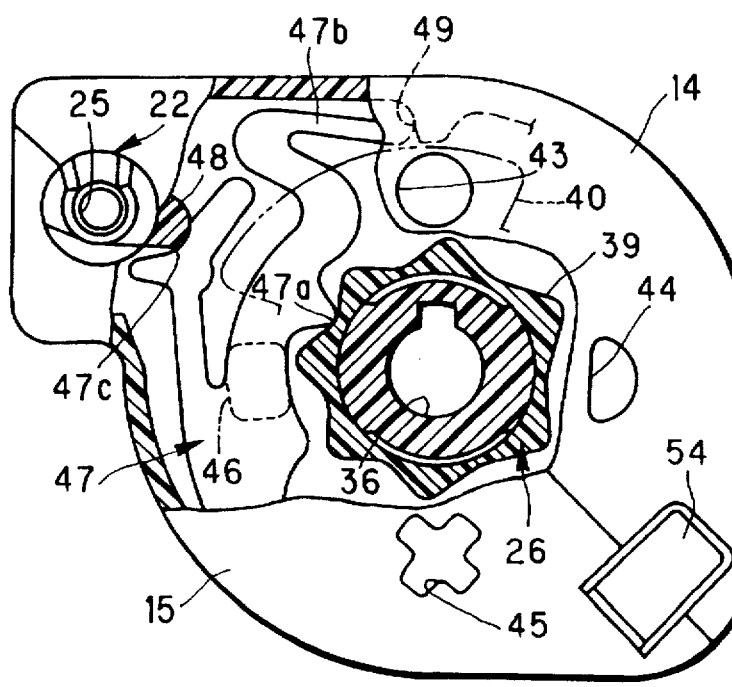
FIG. 6 is a right-hand side elevation, partly broken, illustrating the cassette.

For external recognition of the used status of the photo film 12, the cassette 10, as illustrated in FIG. 6, has indicator openings 43–46 in a face outside the indicator chamber 20. The first opening 43 indicates the unexposed status of the photo film 12. The second opening 44 indicates the partially exposed status of the photo film 12. The third opening 45 indicates the exposed status of the photo film 12. The fourth opening 46 indicates the developed status of the photo film 12.

The spool locking mechanism includes the spool lock 47 and the gear 39, and is linked with the rotation of the shutter 22. The spool lock 47 includes a lock lever, elastically deformable arms 47b and 47c on the ends of the lock lever, and an engaging claw 47a on the middle of the lock lever. The engaging claw 47a is shiftable between positions engaged with, and disengaged from, the gear 39. The deformable arm 47b is pressed against a ridge 49, to bias the engaging claw 47a to the disengaged position. When the shutter 22 has the closed position, the arm 47c is contacted on a key 48, to press the engaging claw 47a against the gear 39 while deforming the deformable arm 47b. The gear 39 is engaged with the engaging claw 47a, to stop the spool 13 from rotating. When the shutter 22 has the open position, the deformable arm 47c is released from being pressed by the key 48. The spool lock 47 comes back to the unlocked position under the bias of the deformable arm 47b.

For the purpose of rendering it possible to detect the undeveloped or developed status of the photo film 12 when accessed by a camera or a photo film processor, there is formed a tongue 54 with the lower shell half 15 across the juncture between the shell halves 14 and 15. The tongue 54, when the photo film 12 is developed, is cut away or folded down toward the inside of the cassette shell 11, to signal the developed status of the photo film 12 in automatically readable fashion.

Figure 7:
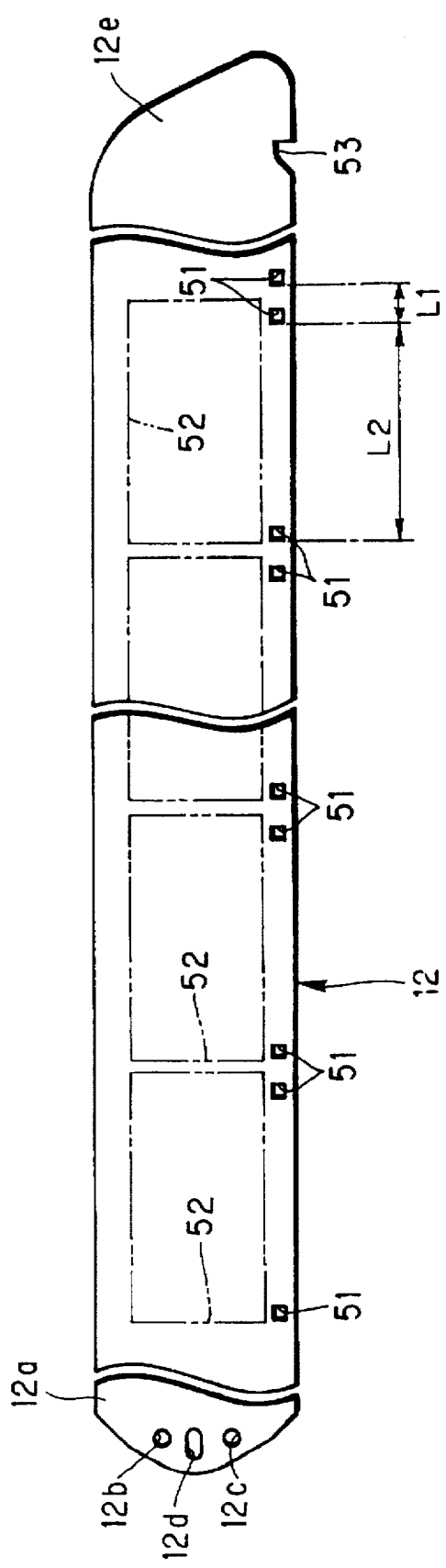
FIG. 7 is a plan view illustrating photo film as viewed from a back surface.

As illustrated in FIG. 7, the photo film 12 is 24 mm wide, and is either a positive photo film or negative photo film. The photo film 12 has one of various lengths determined for the maximum photographable number of frames, e.g. 15, 25 or 40 exposures, and has a particular photo film speed. There is a transparent magnetic recording layer formed in a back surface of the photo film 12 opposite to its emulsion surface, for recording photographic information in various forms usable in taking an exposure, photofinishing, and handling of the photo film 12 after development.

A leader 12e of the photo film 12 has a triangular shape projected on one side for the easiness of being separated by the separator claw 23. There is a train of perforations 51, formed in the photo film 12 on the one side and in a longitudinal direction, for positioning frames on the photo film 12. The perforations 51 are arranged at two different pitches L1 and L2 which alternates in the longitudinal direction. The trains begins at the smaller pitch L1 in the direction away from the leader 12e. A camera controls the movement of the photo film 12 to set the center of a section having the greater pitch L2 at a center of an exposure aperture of the camera with reference to a horizontal direction. An exposure is taken to photograph an image on a frame portion 52, which is indicated by the phantom line in the drawing. The notch 53, which is engaged with the ring-like lip 28b, permits the leading end to protrude from the flanges 27 and 28.

Figure 8:
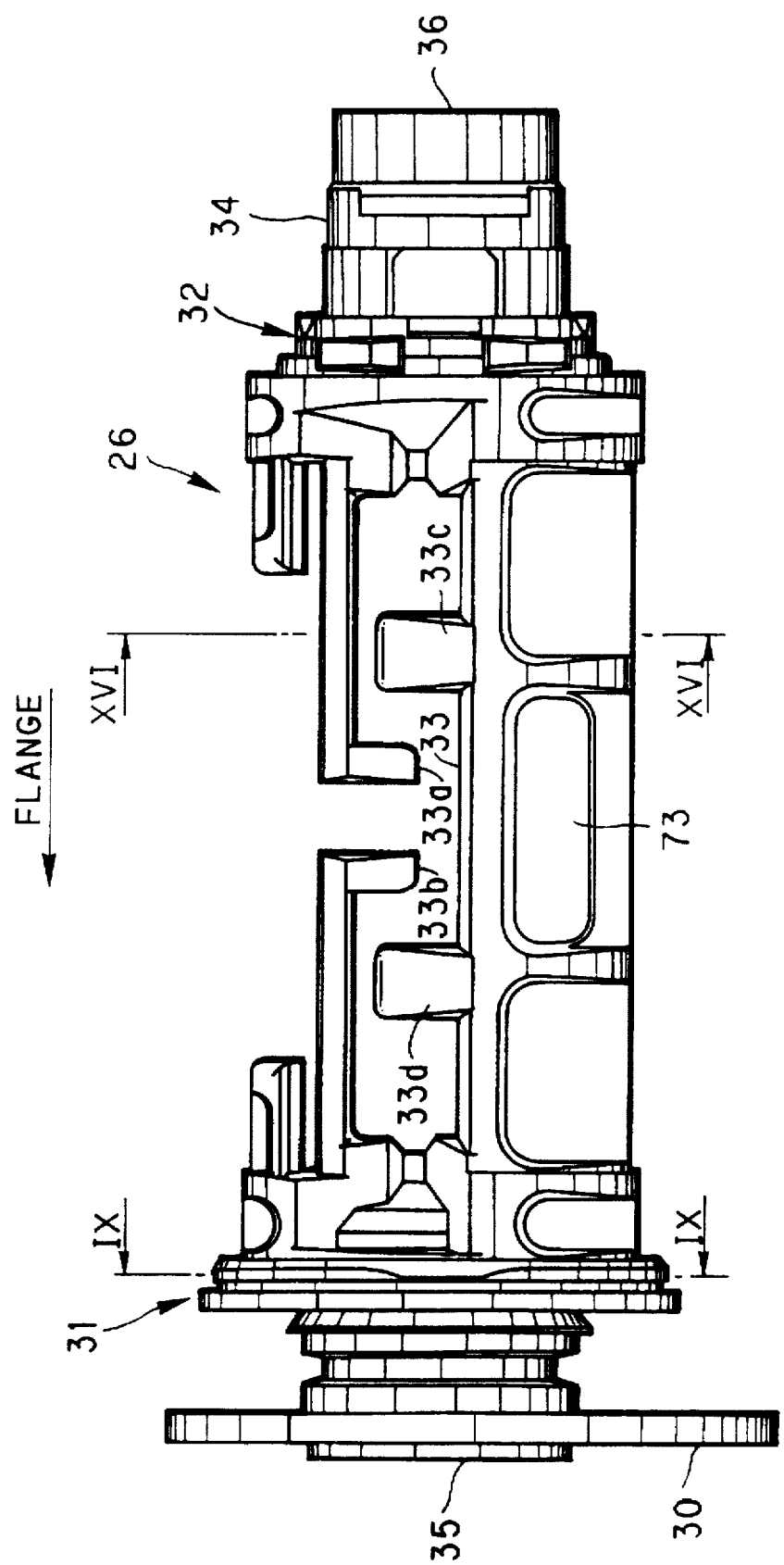
FIG. 8 is a front elevation illustrating the spool core.
Figure 10:
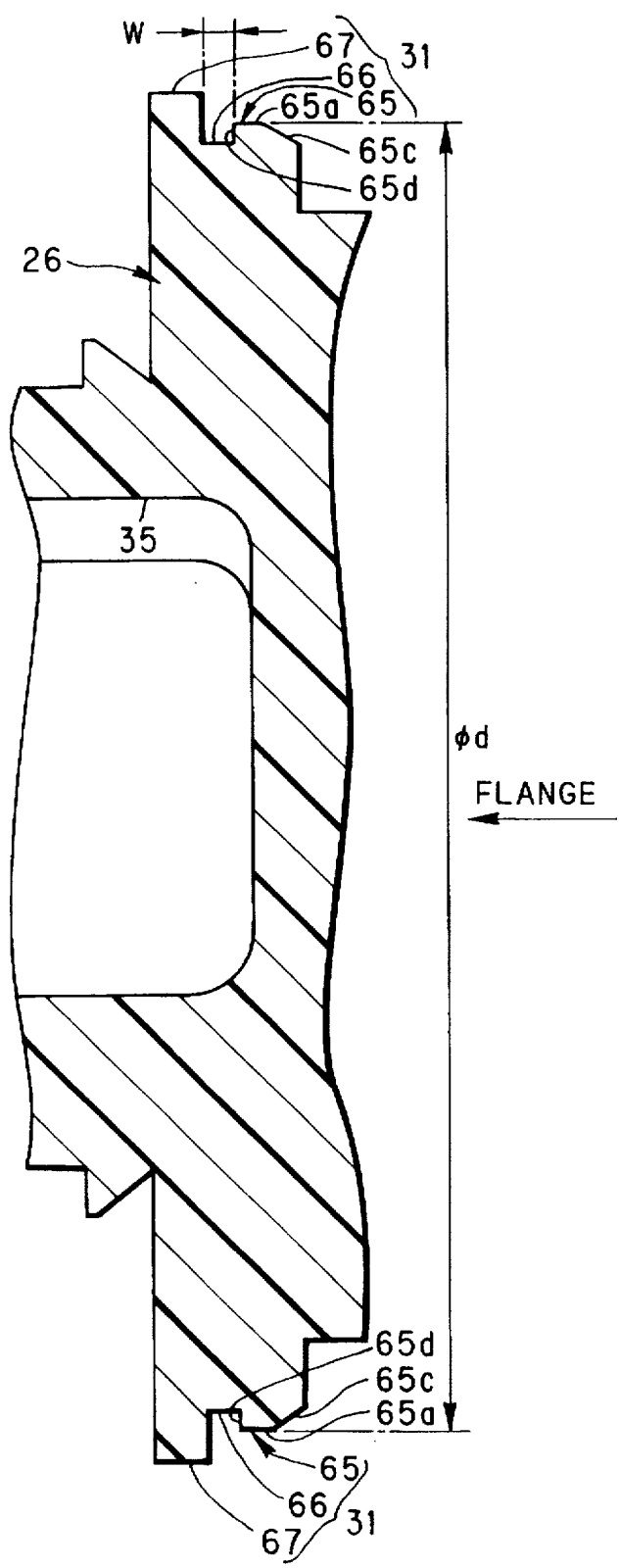
FIG. 10 is a horizontal section taken on line X—X in FIG. 9, illustrating the spool core.

FIG. 8 and 10 illustrate the flange support 31 for securing the flange 27. The flange support 31 has a ring shape projected over a diameter of the spool core 26. The flange support 31 includes a first stopper ring 65, a receiving region 66 and a second stopper ring 67 formed circularly and arranged in the arrow direction in the drawing for insertion of the flange 27. The first stopper ring 65 is ring-like about the spool core 26, and has a height smaller than that of the second stopper ring 67. To smooth insertion of the flange 27, the circular edge directed to the flange 27 is cut away to have inclination.

Figure 9:
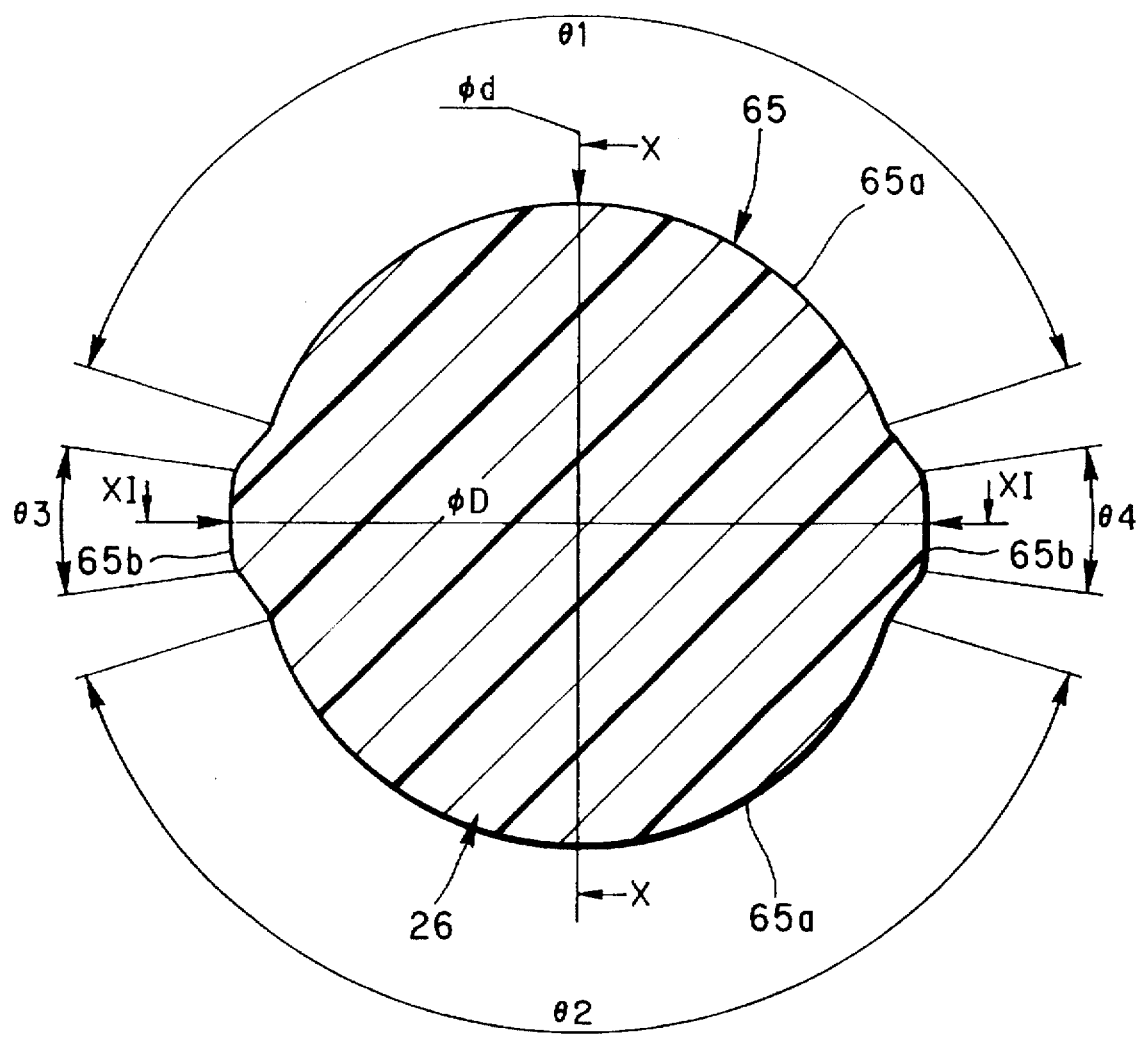
FIG. 9 is a cross section taken on line IX—IX in FIG. 8, illustrating the spool core.

In FIG. 9 as section, which is a of the first stopper ring 65 taken on line IX—IX in FIG. 8, the periphery of the first stopper ring 65 includes first and third sector portions 65a and second and fourth sector portions 65b. The first and third sector portions 65a, as illustrated in FIG. 10, have a diameter $\phi d$, which is smaller than that of the second and fourth sector portions 65b, but greater than that of a face of the receiving region 66. The first and third sector portions 65a have respective ranges with central angles of $\theta 1$ and $\theta 2$ about the spool core 26. The angles of $\theta 1$ and $\theta 2$ are respectively between 90 and 180 degrees, and are opposed to one another with respect to the axis of the spool core 26.

Figure 11:
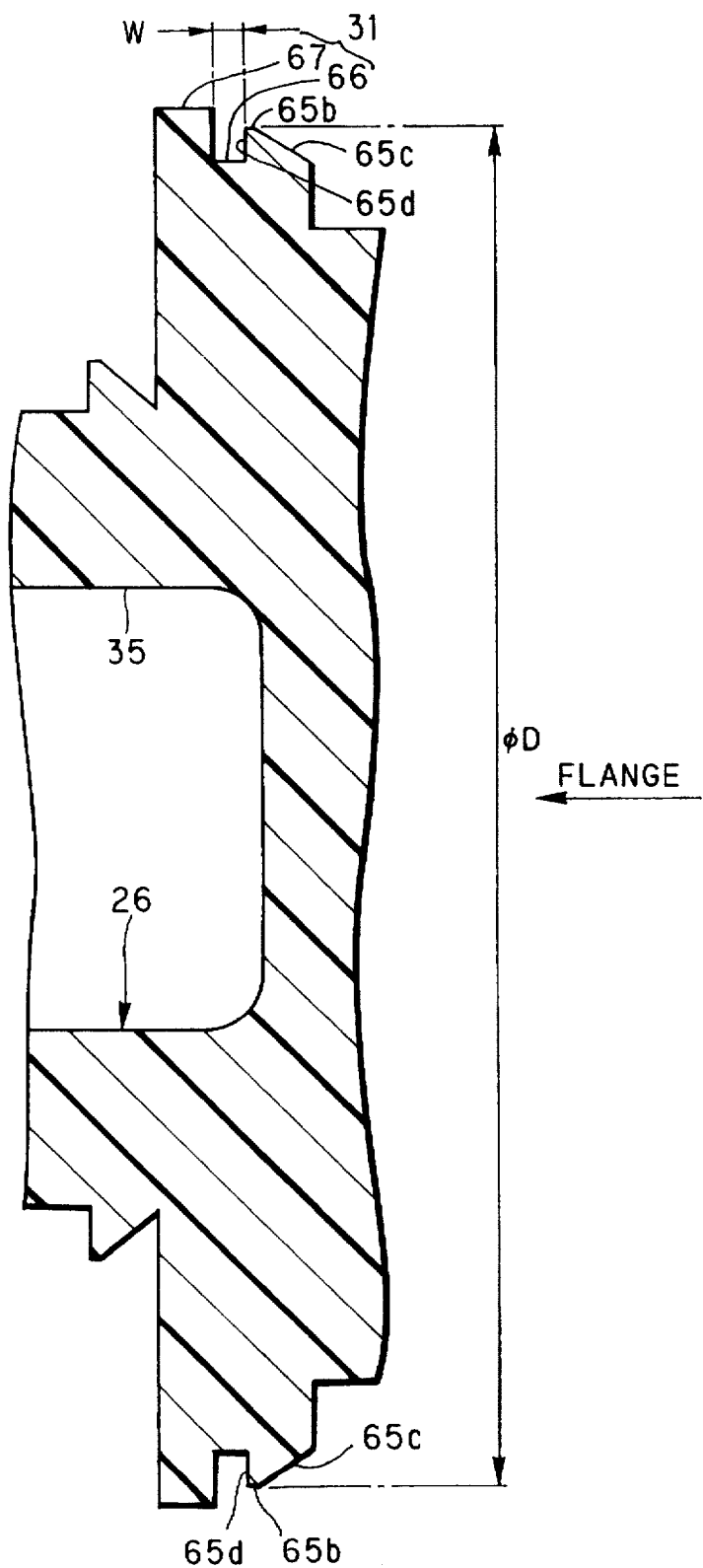
FIG. 11 is a horizontal section taken on line XI–XI in FIG. 9, illustrating the spool core.

The second and fourth sector portions 65b have a diameter $\phi D$ which is smaller than that of the second stopper ring 67. The diameter $\phi D$ is greater than $\phi d$ of the first and third sector portions 65a. The second and fourth sector portions 65b have respective ranges with central angles of $\phi 3$ and $\phi 4$ about the spool core 26. The angles of $\phi 3$ and $\theta 4$ are respectively under 90 degrees, and are opposed to one another with respect to the axis of the spool core 26. As illustrated in FIG. 11, the second and fourth sector portions 65b are provided with an inclined face 65c for smoothing the movement of the flange 27 in abutting the flange 27 on the flange support 31. The second and fourth sector portions 65b at the inclined face 65c have smaller thickness than the first and third sector portions 65a. There are intermediate sloped faces between adjacent ones of the first and third sector portions 65a and the second and fourth sector portions 65b with a small gradient.

Figure 12:
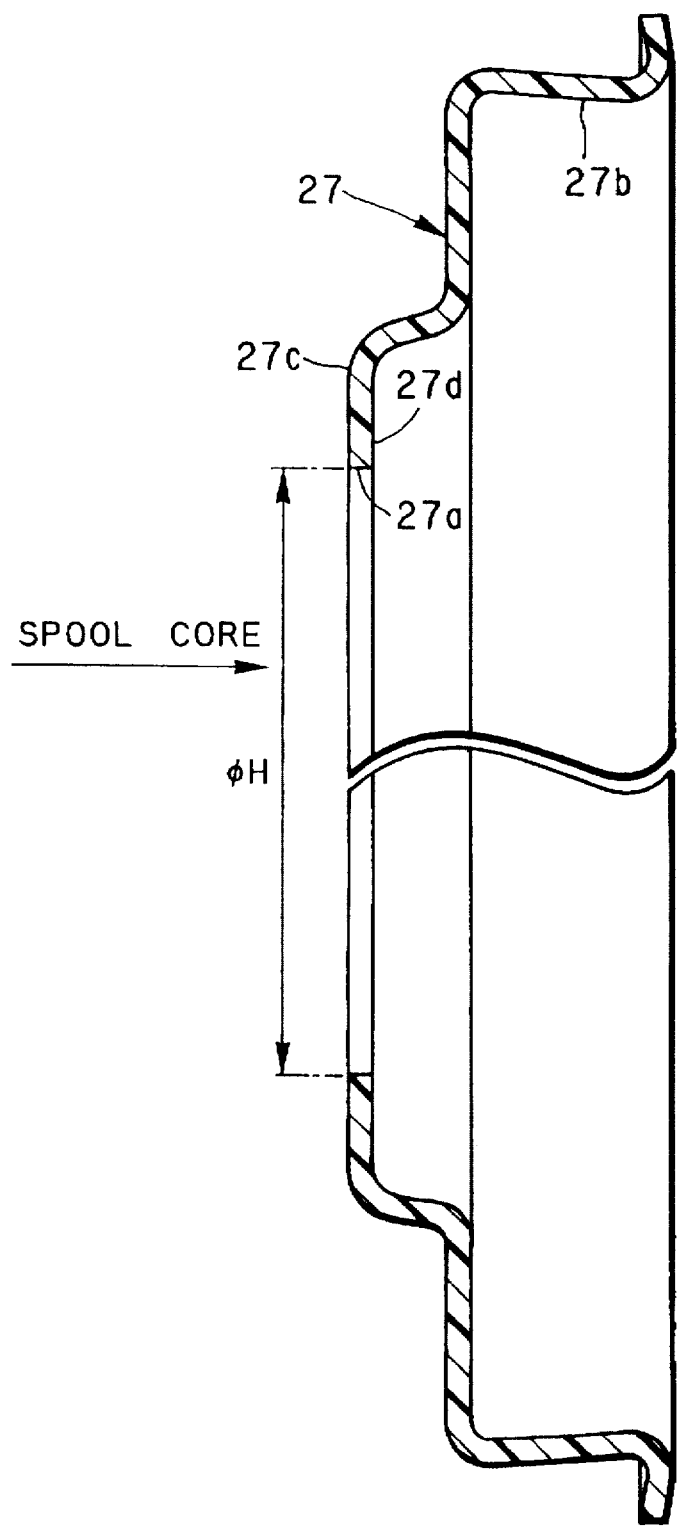
FIG. 12 is a cross section illustrating a flange.

The flange 27 is moved toward the flange support 31 while advancing an outer face 27c in FIG. 12. The first stopper ring 65 presses the edge of the bearing hole 27a in the ranges of the first and third sector portions 65a, and spreads the bearing hole 27a while deforming the flange 27, before the bearing hole 27a is allowed to move toward the receiving region 66. When portions of the flange 27 come to the receiving region 66, then the second and fourth sector portions 65b press the edge of the bearing hole 27a within the space between the bearing hole 27a and the receiving region 66. The bearing hole 27a is spread by deformation of the flange 27, and allowed to moved to the receiving region 66. The second and fourth sector portions 65b have edges with reduced thickness, so that the flange 27 can be inserted smoothly.

When the edge of the bearing hole 27a is entirely received on the receiving region 66, an upright face 65d of the first stopper ring 65 opposite to the inclined face 65c is contacted on the edge of the bearing hole 27a, so that the upright face 65d keeps the flange 27 from moving back beyond the first stopper ring 65 toward a spool end having the key 36. The face of the receiving region 66 has a diameter smaller than the bearing hole 27a, and a width W=0.3 mm greater than thickness of the flange 27, to support the flange 27 rotatably. The second stopper ring 67 is contacted on the bearing hole 27a to regulate an inserted amount of the flange 27.

The flange 27 is shaped like a shallow vessel and is flexible. If the ring-like lip 27b is depressed in the direction from the outer face 27c toward an inner face 27d, it is likely that the bearing hole 27a is spread resiliently toward the outer face 27c. If the ring-like lip 27b is depressed in the direction from the inner face 27d toward the outer face 27c, it is unlikely that the bearing hole 27a is deformed. The flange 28 is stopped by the disk 38 of the barrel member 29 if pushed in reverse to the direction of movement for the flange mounting. The bearing hole 27a of the flange 27, in contrast, is so easy to deform that a force to push the flange 27 in reverse to the direction of movement for the flange mounting might disengage the flange 27 from the flange support 31. However the first stopper ring 65 has the first and third sector portions 65a and the second and fourth sector portions 65b, of which the latter prevents the disengagement of the flange 27.

Should the angles of θ3 and θ4 for the second and fourth sector portions 65b be too great, the flange 27 would be difficult to insert. Should the angles of θ3 and θ4 be too small, the flange 27 would be very likely to drop off to the spool. Hence the angles of θ3 and θ4 are 5–45 degrees, preferably 10–30 degrees, and desirably 15–20 degrees.

Examples of sizes of the bearing hole 27a, the first and third sector portions 65a and the second and fourth sector portions 65b are: φH=12.14 mm, φd=12.4 mm, and φD=12.6 mm. Note that φH is an inner diameter of the bearing hole 27a.

The construction of the present invention is not limited to the spool with the above-mentioned sizes. The diameter φd of the first and third sector portions 65a can be 12.3–12.5 mm, and 1.013–1.03 times as great as the inner diameter φH of the bearing hole 27a in the flange 27. The diameter φd of the first and third sector portions 65a can be preferably 12.35–12.45 mm, and 1.017–1.026 times as great as φH, and desirably 12.38–12.42 mm, and 1.02–1.023 times as great as 100 H. The diameter φD of the second and fourth sector portions 65b can be 12.5–12.7 mm, and 1.03–1.046 times as great as the inner diameter φH of the bearing hole 27a in the flange 27. The diameter φD of the second and fourth sector portions 65b can be preferably 12.55–12.65 mm, and 1.034–1.042 times as great as φH, and desirably 12.58–12.62 mm, and 1.036–1.04 times as great as φH. It is to be noted that this construction and those relative sizes are applicable to the flange support 32 and the bearing hole 28a of the flange 28 on the opposite side.

These sizes are closely related to the resiliency of the flanges 27 and 28. Examples of sizes, material, and other specifics of the flanges 27 and 28 will be hereinafter described.

The flanges 27 and 28 respectively have an outer diameter of 28.28 mm, maximum thickness of at most 0.19 mm, minimum thickness of at least 0.05 mm or 0.1 mm, and average thickness of 0.15 mm.

Characteristics required for the flanges 27 and 28 are resistance to heat, strength, and resistance to abrasion. Preferred resin has characteristics of:

(1) Temperature of thermal deformation: 80° C. or higher under 18.6 kg/cm$^2$;

(2) Modulus in elasticity in flexure: 13,000–30,000 kg/cm$^2$;

(3) Surface hardness: 80 or more in Rockwell R-scale.

To form the flanges 27 and 28, there are two preferable techniques. In a first one, a continuous resin sheet of a polyethylene type having small thickness (0.15 mm) is formed in accordance with extrusion. The continuous sheet is thermoformed in a forming step in accordance with the vacuum forming or pressure forming. The continuous sheet is punched to form the flanges. The second technique is the injection molding, which is characterized in that the producing speed and efficiency is the highest as well as the greatest suitability to producing automation, that sizes of molding can be regularized with easiness, and that a high quality of molded pieces is maintained. However injection molding is unsuitable to resin with low fluidity in a mold. Therefore it is desirable in the injection molding to form the flanges 27 and 28 from resin which has characteristics meeting the ranges as indicated above, and has somewhat great fluidity in a mold.

Desirable examples of the resin are nylon-modified polyphenyl ether, polyolefin-modified polyphenyl ether, and polyacetal (POM). It is possible with the resin to mix antioxidant, light-shielding material, antistatic, lubricant and the like, as required.

The nylon-modified polyphenyl ether is constituted by polyphenyl ether (PPE) and nylon blended with the polyphenyl ether (PPE). Preferred percentage of composition of nylon-modified polyphenyl ether is 30–70 wt. % of nylon, 20–60 wt. % of polyphenyl ether (PPE), and 0–20 wt. % of thermoplastic elastomer. Desirable percentage of the composition is 40–65 wt. % of nylon, 25–55 wt. % of polyphenyl ether (PPE), and 3–15 wt. % of thermoplastic elastomer. The most advantageous percentage of the composition is 45–60 wt. % of nylon, 30–50 wt. % of polyphenyl ether (PPE), and 5–13 wt. % of thermoplastic elastomer.

Preferred examples of the nylon to be blended in the nylon-modified polyphenyl ether are nylon 6, nylon 6/6, nylon 12, nylon 46, non-crystalline nylon, and semi-aromatic nylon. Preferred examples of the thermoplastic elastomer are ethylene propylene rubber (EPR) and styrene butadiene rubber.

The polyolefin-modified polyphenyl ether is constituted by polyphenyl ether (PPE) and blended polyolefin (PO). Preferred percentage of composition of polyolefin-modified polyphenyl ether is 30–70 wt. % of polyolefin (PO), 20–70 wt. % of polyphenyl ether (PPE), and 0–20 wt. % of thermoplastic elastomer. Desirable percentage of the composition is 40–65 wt. % of polyolefin (PO), 25–60 wt. % of polyphenyl ether (PPE), and 3–15 wt. % of thermoplastic elastomer. The most advantageous percentage of the composition is 45–60 wt. % of polyolefin (PO), 30–50 wt. % of polyphenyl ether (PPE), and 5–13 wt. % of thermoplastic elastomer.

Preferred examples of the polyolefin (PO) for polyolefin-modified polyphenyl ether are polypropylene (PP) and polyethylene. Preferred examples of the thermoplastic elastomer are ethylene propylene rubber (EPR) and styrene butadiene rubber.

If higher resistance to heat is desired to the nylon-modified polyphenyl ether and/or the polyolefin-modified polyphenyl ether, then the percentage of the polyphenyl ether (PPE) can be heightened with advantages. If higher strength is desired, then the percentage of the nylon and/or the polyolefin can be heightened with advantages. If lower stiffness is desired, then the percentage of the rubber can be heightened with advantages.

A full length of the spool core 26 is approximately 36.8 mm. A maximum diameter of the spool core 26 adapted to winding of the photo film 12 between the flange supports 31 and 32 is approximately 7–12 mm. An interval between the ring-like lips 27b and 28b is approximately 24.3 mm, which is a width of the photo film 12.

In the photo film cassette 10, the edges of the outermost turn of the roll of the photo film 12 are covered by the ring-like lips 27b and 28b to prevent the photo film 12 from being loosened. It is necessary to change the core diameter of the spool for different lengths of the photo film 12 for different numbers of exposures to be taken, for the purpose of keeping constant an interval of the outermost turn and the ring-like lips 27b and 28b. Examples of changed diameters are: 7 mm for the photo film 12 of 40 exposures, 10.7 mm for the photo film 12 of 25 exposures, and 12 mm for the photo film 12 of 15 exposures.

Figure 13:
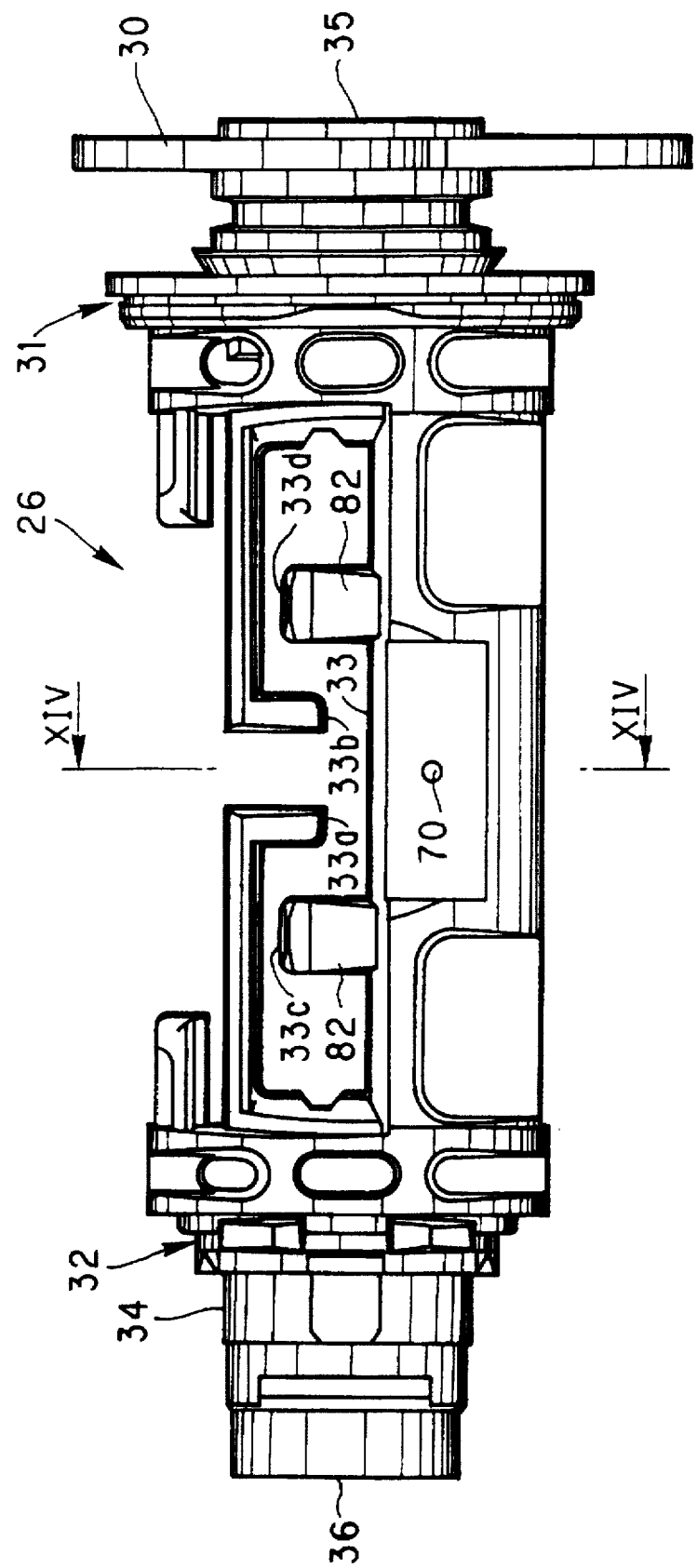
FIG. 13 is a back elevation illustrating the spool core.
Figure 14:
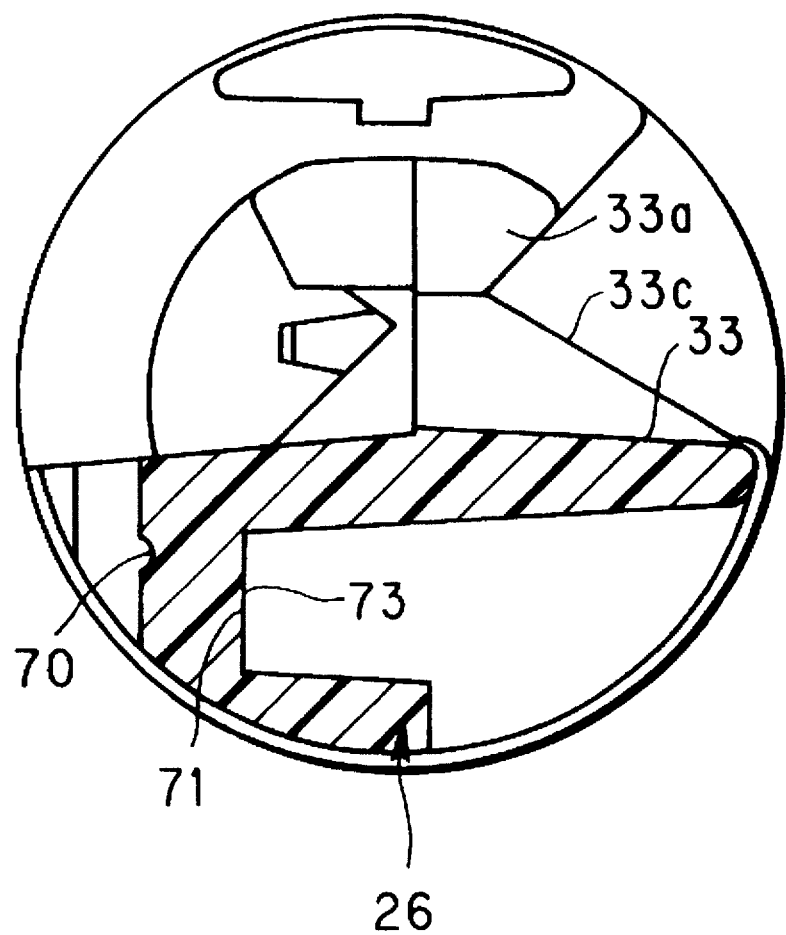
FIG. 14 is a cross section taken on line XIV—XIV in FIG. 13 illustrating the spool core.

For the injection molding of the spool core 26, a gate portion 70 is preferably formed in a retracted position at the center of the bottom of the slot 33, as illustrated in FIGS. 13 and 14. There are formed a plurality of relief portions 73 in the spool core 26 for the purpose of causing resin to flow in the order of entry through the gate portion 70, arrival to a wall 71, and then the flow until packing. The relief portions 73 make it possible to regulate the thickness.

Experiments were conducted to test the effect of the flange support 31. Performance of flange supports was evaluated in comparison. Results of the experiments are shown in TABLE 1.

TABLE 1

| Samples of Flange Support | Comparative Example A | Comparative Example B | Present Embodiment |
| --- | --- | --- | --- |
| Suitability for Insertion | o | x | o |
| Deformation | x | x | o |
| Likeliness of Drop | x | o | o |

Note that, in TABLE 1, Comparative Examples A and B are flange supports of the following shapes:

A: a set of six stopper claws which are formed about the spool core 26, and defined by forming notches regularly in the first stopper ring 65 having a diameter of 12.6 mm;

B: the first stopper ring 65 having a diameter of 12.6 mm.

In TABLE 1, samples of the flange support were evaluated by observing the following characteristics:

Suitability for insertion: the flange 27 was pressed for insertion with inserting force of 100 gf. It was observed whether the flange 27 could moved past the first stopper ring 65 or the stopper claws.

Deformation: it was observed whether the bearing hole 27a was deformed after the insertion of the flange 27.

Likeliness of drop: the periphery of the flange 27 was pressed with force of 50 gf in a direction from the outer face 27c toward the inner face 27d. It was observed whether the flange 27 was dropped from the first stopper ring 65 or the stopper claws.

In Comparative Example A, there occurred a corrugated deformation on the edge of the bearing hole 27a in contact with the six stopper claws after insertion of the flange 27. When the periphery of the flange 27 was pressed from the outer face 27c to the inner face 27d with the force of 50 gf, the flange 27 was forcibly moved past some of the stopper claws. In Comparative Example B, the first stopper ring 65 had a diameter of 12.6 mm, so that it was impossible to insert the flange 27. In the present embodiment, the first stopper ring 65 included the second and fourth sector portions 65b being 12.6 mm across and the first and third sector portions 65a being 12.4 mm across. The second and fourth sector portions 65b of the greater diameter had a narrow range. The flange 27 was smoothly inserted. Even when the periphery of the flange 27 was pressed from the outer face 27c to the inner face 27d with the force of 50 gf, the flange 27 was not dropped. It was observed that the shape of the first stopper ring 65 was the most preferable, as understood from TABLE 1.

The periphery of the first stopper ring 65 is shaped to have two different diameters. The present invention is also applicable to a first stopper ring shaped to have three or more diameters, or a first stopper ring shaped as an ellipse with a longer axis $\phi D$ and a shorter axis $\phi d$. In the above embodiment, the second and fourth sector portions 65b with the longer diameter are disposed in the positions of 180 degrees. However three or more sector portions 65b with the longer diameter may be disposed. In consideration of experiments, it is preferable that there are two or more and six or less sector portions with the longer diameter. Three sector portions can be disposed in positions of 120 degrees. Four sector portions can be disposed in positions of 90 degrees. Five sector portions can be disposed in positions of 72 degrees. With a first stopper ring having the three sector portion with the longer diameter, the entire contour of the first stopper ring can be constituted of six arcs, which can be three having a longer diameter and three having a shorter diameter.

Figure 15:
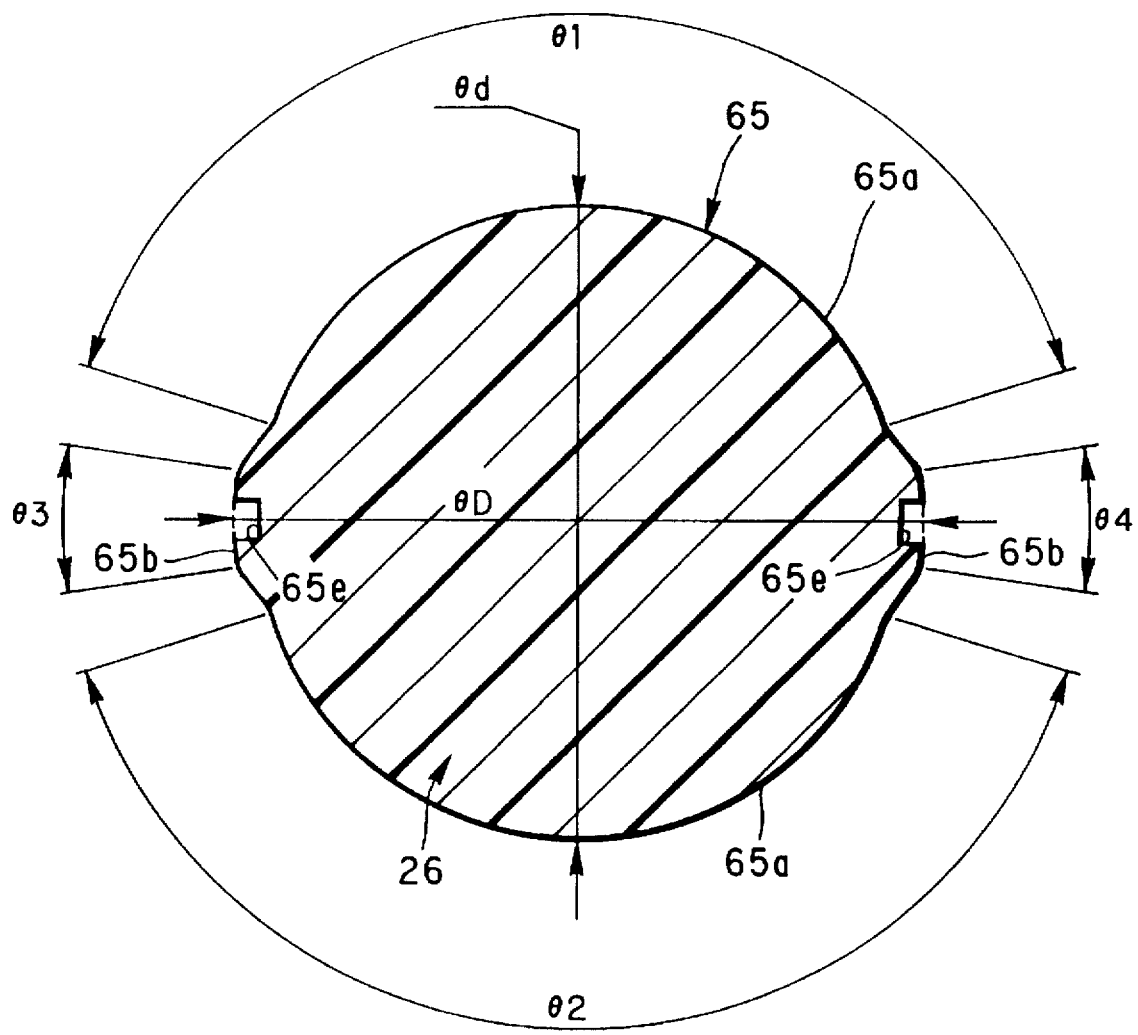
FIG. 15 is a cross section illustrating another preferred spool core, which has recesses for greater moldability.

It is also desirable to form recesses 65e respectively in the second and fourth sector portions 65b to raise moldability of the second and fourth sector portions 65b having $\theta 3=\theta 4 \leq 90°$. It is to be noted that two portions defined beside each of the recesses 65e are not counted as each of plural sector portions as referred to, because the recesses 65e does not affect the operation of the second and fourth sector portions 65b past which the flange 27 is moved. As illustrated in FIG. 15, it is preferable that the recesses 65e are as deep as the face of the receiving region 66, or slightly less deep than the face of the receiving region 66.

Another preferred embodiment is described below, in which accidental separation of the photo film 12 is avoided while the photo film 12 is fully drawn from the cassette for the removal of the photo film 12.

As illustrated in FIG. 16, the retaining claw 33d has a notched portion 80 in the V-shape as viewed in section, on the side opposite to a side nearer to the passage port 21. Namely the notched portion 80 is adapted to be resistant to the pulling of the photo film 12. The notched portion 80 is defined by a retaining face 81 and a support face 82, which are intersected at a retaining point $\theta 3$ where an edge of the retaining hole 12c in the trailer 12a is contacted when the photo film 12 is entirely pulled out of the cassette shell 11.

Figure 17:
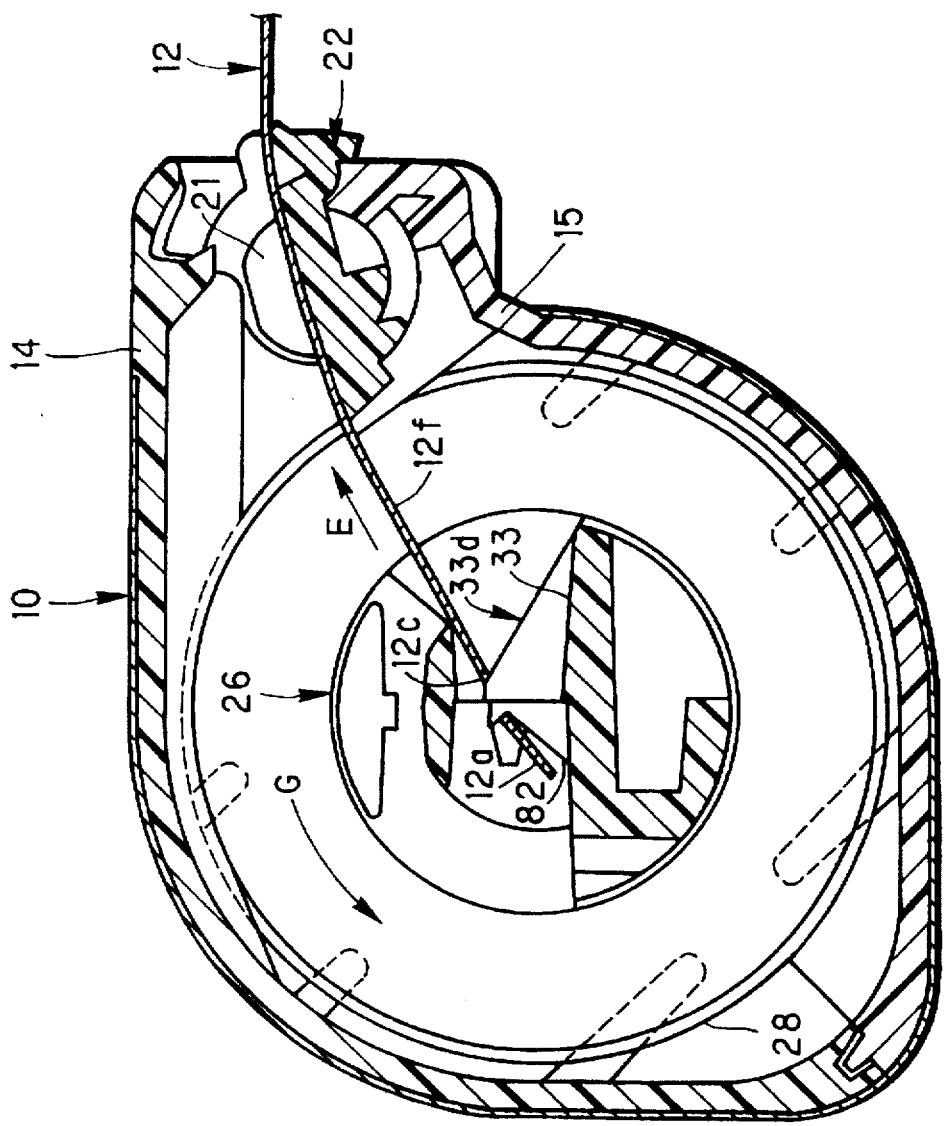
FIG. 17 is a cross section illustrating the cassette of which the photo film is unwound substantially entirely.

The support face 82 is formed with an inclination in a rotational direction G and relative to Line E. The rotational direction G is a direction of winding the photo film 12 about the spool core 26. Line E, as illustrated in FIGS. 16 and 17, is a line defined by the trailer 12a extended between the spool core 26 and the passage port 21. Assuming the support face 82 is inclined at an angle of $\theta 5$. The angle $\theta 5$ is 3–20 degrees, preferably 5–15 degrees, and desirably 8–10 degrees. Further, the support face 82 in FIG. 16 is included in a region defined between Line E and a parallel line having a distance F to Line E. The distance F is 0.1–0.7 mm, preferably 0.3–0.6 mm, and desirably 0.4–0.5 mm. Note that the retaining claw 33c has the same shape as the retaining claw 33d, as they are symmetrical. Further description of the retaining claw 33c is omitted.

After effecting exposures in a camera, the photo film cassette 10 is forwarded to a photo laboratory, and subjected to development. Operation of the photo film development is effected automatically by a photo film processor. In the photo film processor, the shutter 22 is rotated to the open position. The spool 13 is driven to advance the photo film 12. After the advancement of nearly all the photo film 12, the trailer 12a is still engaged with the spool 13. The spool 13 is stopped from rotating, before photo film separation is effected to disengage the trailer 12a from the spool 13.

When the photo film 12 is nearly fully drawn out of the cassette shell 11, force in the direction of Line E is applied to the trailer 12a as retained. Due to tension applied to rear edges of the retaining holes 12b and 12c contacted on the retaining claws 33c and 33d, curling occurs in a distal rear end of the photo film 12 behind the retaining holes 12b and 12c, in a direction for the trailer 12a loosely to rise on the support face 82 of the notched portion 80. However the inclination of the support face 82 is optimized to prevent the distal rear end of the trailer 12a from contacting the support face 82. The retention of the photo film 12 is thus ensured and the trailer 12a is reliably kept from being separated from the spool 13.

For the photo film separation, an arcuate guide plate is inserted through the passage port 21 and into the slot 33. The contact ridges 33a and 33b are flexed. The trailer 12a is disengaged from the spool 13 automatically. The photo film 12 thus can be conveyed to the inside of the photo film processor without cutting the photo film 12. The photo film 12 after the development and the printing is conveyed with the trailer 12a directed ahead. Another guide plate is used for the photo film mounting, in which a trailer of the photo film is engaged with the spool 13. The guide plate is different from the guide plate used in the photo film separation and has a claw for engagement with the opening 12d in the trailer 12a.

In the photo film mounting, the claw of the guide plate is engaged with the opening 12d. The trailer 12a with the guide plate is inserted into the cassette shell 11, flexes the contact ridges 33a and 33b, and engages the retaining holes 12b and 12c with the retaining claws 33c and 33d. After rotating the spool 13, the photo film 12 is entirely contained in the cassette shell 11. The shutter 22 is rotated to the closed position to finish operation in the photo film processor. In controlling of stopping the spool, an indicator plate integral with the photo film 12 is caused to emerge through any of the indicator openings 43–46 indicating the developed status of the photo film 12 as contained. When the photo film cassette 10 is removed from the photo film processor, the photo film 12 after the development is contained in the photo film cassette 10 in a roll form, and returned to a user.

In view of suitability to mass production and cost, thermoplastic resin is preferred for the material of the spool 26, the flanges 27 and 28, and the cassette shell 11. Light-shielding material can be added to the resin. A ratio of carbon black as light-shielding material can be in a range of 0.05–3.00 wt. %. The resin can be provided with addition of lubricant (silicone oil etc.), antistatic, inorganic or organic pigment (titanium oxide etc.), processing aid (zinc stearate etc.), antioxidant, nucleator, and plasticizer, and the like, in amounts as much as required.

Examples of the resin are polystyrene, high-impact polystyrene, styrene-acrylonitrile copolymer, acrylonitrile-butadiene-styrene (ABS) copolymer, polypropylene resin, high-density polyethylene resin, polyethylene terephthalate, polybutylene terephthalate, polycarbonate resin, polyvinyl chloride, and modified resin of any of those examples. In consideration of heightened dimensional precision, heightened physical strength and higher suitability to ultrasonic welding, it is preferred to use high-impact polystyrene inclusive of 0.1–10 wt. % of synthetic rubber which has melt flow rate of 1.0–10.0 grams per 10 minutes, more preferably 2.0–8.0 grams per 10 minutes, and desirably 2.5–7 grams per 10 minutes. In view of avoiding deformation, Vicat softening temperature of the resin is 80° C. or higher under load of 15 kg, preferably 85° C. or higher, and desirably 90° C. or higher. Modulus in elasticity in flexure of the resin is 15,000–30,000 kg/cm$^2$, preferably 18,000–28,000 kg/cm$^2$, and desirably 20,000–28,000 kg/cm$^2$.

Carbon black is added for shielding light. The carbon black is classified according to producing techniques as furnace carbon black, channel carbon black and thermal carbon black. Furnace carbon black having pH 5–9 and an average grain diameter of 10–80 μm, and particularly furnace carbon black having pH 6–8 and an average grain diameter of 15–50 μm, is preferred because of good light-shielding performance and little affect to image reproduction (fogging and/or increase or decrease in the photosensitivity of the photo film.

Representative examples of preferred carbon blacks on the market include Carbon Black #20(B), #30(B), #33(B), #40(B), #41(B), #44(B), #45(B), #50, #55, #100, #600, #2200(B), #2400(B), MA8, MA11 and MA100 (trade names), all produced by Mitsubishi Chemical Industries Ltd. Other examples of carbon blacks are Black Pearls 2, 46, 70, 71, 74, 80, 81 and 607, Regal 300, 330, 400, 660 and 991 and SRF-S, Sterling 10, SO, V, S, FT-FF and MT-FF (trade names), all produced by Cabot Corp.; and Uniteel R, BB, 15, 102, 3001, 3004, 3006, 3007, 3008, 3009, 3011, 3012, XC-3016, XC-3017 and 3020 (trade names), all produced by Ashland Chemical Co. However, the carbon black is by no means limited to these examples.

Furnace carbon black particle of less than 10 μm diameter would be unsuitable for kneading, so that light-shielding ability and physical strength would be low. Above 100 μm, dispersing quality would be higher, but light-shielding ability would be inferior. Increasing density of carbon black to compensate light-shielding ability would result in lowering physical strength and moldability so that the products would be nearly useless in practice. Most carbon blacks beyond the range from pH5 to pH9 would not be applicable because they would be liable to adversely affect photographic properties of the film.

To evade adverse influence on the photographic properties of the photographic film, free sulfur component included in the above-described carbon black should be 0.6% or less, preferably 0.3% or less, and more preferably 0.1% or less. Cyanogen compound included in the carbon black should be 0.01 or less, preferably 0.005% or less, and more preferably 0.001% or less. Aldehyde compound included in the carbon black should be 0.1% or less, preferably 0.05% or less, and more preferably 0.01% or less. It is necessary to consider that even a small amount of these matters have harmful effect on photographic properties.

Loading of the furnace carbon black is preferably 0.05 wt. % to 3.00 wt. %, in the interest of light-tightness, moldability and physical strength of the cassette shell 11. Loading of less than 0.05 wt. % would result in insufficient light-shielding ability. Loading of more than 3.00 wt. % would result in lowering physical strength of the cassette shell 11 and increasing water absorption so much, that weld marks, silver streaking and other failure are liable to occur in injection molding, which would result in deterioration of appearance and surface strength.

As the light-shielding material, inorganic pigment such as titanium oxide, red oxide, calcium carbonate, etc. or organic pigment may be used in combination with the above-described carbon black.

To provide the 26, the 27 and 28, and the cassette shell 11 with a lubricant characteristic, lubricant can be mixed with resin molded into those parts, or can be applied to coat the parts. Examples of the lubricants are silicone oil; higher fatty acid amides, including oleic acid amide and erucic acid amide; metal salt of higher fatty acid, including zinc stearate; and ester, including fatty acid higher alcohol ester, and fatty acid polyvalent alcohol ester.

Examples of silicone oil that are usable with resin molded into the 26, the 27 and 28, and the cassette shell 11 are dimethyl polysiloxane and carboxyl-modified silicone lubricants disclosed in JP-A 62-284355 and 62-286043. Ratio of the silicone oil to be added can be in a range of 0.05–5.0 wt. %, preferably in a range of 1.0–3.0 wt. %.

Loading of less than 0.05 wt. % would have little smoothing effect. Loading of more than 5.0 wt. % would cause slipping between the resin and screws in an injection molding machine, thereby elongating molding cycles and also increasing the amount of silicone oil bleeding out to the product surface. The bled-out oil would be transferred to the photographic film 12 contained in the cassette shell 11, and adversely would affect photographic properties of the photographic film, for example, would hinder developing agents from dispersing over the photographic film on photographic processing. In addition, weldability for ultrasonic sealing of the joints between the upper and lower shell halves 14 and 15 would be lowered.

The viscosity of silicone oil is preferably from 1,000 cS to 60,000 cS at 25° C. Viscosity of less than 1,000 cS at 25° C. would result in so large bleedout that has harmful effect on photographic properties. Silicone oil having a viscosity above 60,000 cS would be too difficult to knead into the resin to use in practice. Although there are various kinds of modified silicone oils, such as fluorine-modified silicone oil, on the market, most of them have harmful influence on photographic properties of the photographic film. They are found to be inapplicable to the cassette 10, for the reasons that they cannot provide sufficient smoothness to the resin, or cause remarkable thermal decomposition during the injection molding.

It is preferable to add modifying agents as required, to be hereinafter described. To prevent oxidative destruction of the resin and to prevent creation of breakdown products (alcohol, aldehyde, ketone, carboxylic acid, etc.) harmful to the performance of the photo film, antioxidant can be added preferably to the resin. Examples of antioxidants are as follows:

(a) Phenol-based antioxidants:

Vitamin E; vitamin E carboxylate ester; 6-tert-butyl-3-methylphenyl derivatives; 2,6-di-tert-butyl-p-cresol; 2,2'-methylenebis-(4-ethyl-6-tert-butylphenol); 4,4'-butylidenebis(6-tert-butyl-m-cresol); 4,4'-thiobis(6-tert-butyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl) benzene; and tetrakis[methylene-3-(3',5'-di-tert-butyl-4'-hydroxyphenyl)propionate]methane.

(b) Ketone amine condensate-based antioxidants:

6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-based antioxidants:

Phenyl-α-naphthylamine; N-phenyl-β-naphthylamine; N-phenyl-N'-isopropyl-p-phenylenediamine; N,N'-diphenyl-p-phenylenediamine; N,N'-di-βnaphthyl-p-phenylenediamine; and N-(3'-hydroxybutylidene)-1-naphthylamine.

(d) Imidazole-based antioxidants:

2-mercaptobenzoimidazole; zinc salt of 2-mercaptobenzoimidazole; and 2-mercaptomethylbenzoimidazole.

(e) Phosphite-based antioxidants:

Alkylated allylphosphite; diphenylisodecylphosphite; sodium tris(nonylphenyl) phosphite; tris(nonylphenyl) phosphite; and triphenyl phosphite.

(f) Thiourea-based antioxidants:

Thiourea derivatives; and 1,3-bis(dimethylamino-propyl)-2-thiourea.

(g) Other antioxidants useful for air oxidation:

Dilauryl thiodipropionate.

(h) Hindered phenol-based antioxidants:

1,3,5-trimethyl-2,4,6-tris(3,5-di-tert-butyl-4hydroxybenzyl)benzene; tetrakis[methylene(3,5-di-tert-butyl-4-hydroxy-hydrocinnamate)]methane; octadecyl-3,5-di-tert-butyl-4-hydroxy-hydrocinnamate; 2,2',2'-tris[(3,5-di-tert-butyl-4-hydroxyphenyl)propionyloxy] ethylisocyanurate; tetrakis(2,4-di-tert-butyl-phenyl)-4,4'-biphenylene diphosphite; 4,4'-thiobis(6-tert-butyl-o-cresol); 2,2'-thiobis(6-tert-butyl-4-methylphenol); tris(2-methyl-4-hydroxy-5-tert-butylphenyl)butane; 2,2'-methylenebis(4-methyl-6-tert-butylphenol); 4,4'-methylenebis(2,6-di-tert-butylphenol); 4,4'-butylidenebis(3-methyl-6-tert-butylphenol); 2,6-di-tert-butyl-4-methylphenol; 4-hydroxymethyl-2,6-di-tert-butylphenol; 2,6-di-tert-4-n-butylphenol; 2,6-bis(2'-hydroxy-3'-tert-butyl-5'-methylbenzyl)-4-methylphenol; 4,4'-methylenebis(6-tert-butyl-o-cresol); and 4,4'-butylidene-bis(6-tert-butyl-m-cresol).

Among these, particularly preferred antioxidants have a melting point of 100° C. or higher, and more preferably 120° C. or higher, because of small amounts of bleedout and thermal decomposition and little influence to image reproduction of the photo film.

Representative examples of commercially available antioxidants are described below.

(1) Phenol-based antioxidants:

SUMILIZER BHT (trade name, manufactured by Sumitomo Chemical), IRGANOX 1076 (trade name, manufactured by Ciba Geigy), MARK AO-50 (trade name, manufactured by Adeca Argus), SUMILIZER BP-76 (trade name, manufactured by Sumitomo Chemical), TOMINOX SS (trade name, manufactured by Yoshitomi), IRGANOX 565 (trade name, manufactured by Ciba Geigy), IONOX WSP (trade name, manufactured by ICI), SANTONOX (trade name, manufactured by Monsanto), SUMILIZER WX R (trade name, manufactured by Sumitomo Chemical), ANTAGECRYSTAL (trade name, manufactured by Kawaguchi), IRGANOX 1035 (trade name, manufactured by Ciba Geigy), ANTAGE W-400 (trade name, manufactured by Kawaguchi), NOCLIZER NS-6(trade name, manufactured by Ohuchi Shinko), IRGANOX 1425 WL (trade name, manufactured by Ciba Geigy), MARK AO-80 (trade name, manufactured by Adeca Argus), SUMILIZER GA-80 (trade name, manufactured by Sumitomo Chemical), TOPANOL CA (trade name, manufactured by ICI), MARK AO-30 (trade name, manufactured by Adeca Argus), MARK AO-20 (trade name, manufactured by Adeca Argus), IRGANOX 3114 (trade name, manufactured by Ciba Geigy), MARK AO-330 (trade name, manufactured by Adeca Argus), IRGANOX 1330 (trade name, manufactured by Ciba Geigy), CYANOX 1790 (trade name, manufactured by ACC), IRGANOX 1010 (trade name, manufactured by Ciba Geigy), MARK AO-60 (trade name, manufactured by Adeca Argus), SUMILIZER BP-101 (trade name, manufactured by Sumitomo Chemical), and TOMINOX TT (trade name, manufactured by Yoshitomi).

(2) Phosphorus-based antioxidants:

IRGAFOS 168 (trade name, manufactured by Ciba Geigy), MARK 2112 (trade name, manufactured by Adeca Argus), WESTON 618 (trade name, manufactured by Vorg-Warner), MARK PEP-8 (trade name, manufactured by Adeca Argus), ULTRANOX 626 (trade name, manufactured by Vorg-Warner), MARK PEP-24G (trade name, manufactured by Adeca Argus), MARK PEP-36 (trade name, manufactured by Adeca Argus), and HGA (trade name, manufactured by Sanko).

(3) Thioether-based antioxidants:

DLTDP "YOSHITOMI" (trade name, manufactured by Yoshitomi), SUMILIZER TPL (trade name, manufactured by Sumitomo Chemical), ANTIOX L (trade name, manufactured by Nippon Oil), DMTD "YOSHITOMI" (trade name, manufactured by Yoshitomi), SUMILIZER TPT (trade name, manufactured by Sumitomo Chemical), ANTIOX M (trade name, manufactured by Nippon Oil), DSTP "YOSHITOMI" (trade name, manufactured by Yoshitomi), SUMILIZER TPS (trade name, manufactured by Sumitomo Chemical), ANTIOX S (trade name, manufactured by Nippon Oil), SEENOX 412S (trade name, manufactured by Sipro), MARK AO-412S (trade name, manufactured by Adeca Argus), SUMILIZER TP-D (trade name, manufactured by Sumitomo Chemical), MARK AO-23 (trade name, manufactured by Adeca Argus), SAND-STAB P-EPQ (trade name, manufactured by Sand), IRGAFOS P-BPQ FF (trade name, manufactured by Ciba Geigy), IRGANOX 1222 (trade name, manufactured by Ciba Geigy), MARK 329K (trade name, manufactured by Adeca Argus), WESTON 399 (trade name, manufactured by Vorg-Warner), MARK 260 (trade name, manufactured by Adeca Argus), and MARK 522A (trade name, manufactured by Adeca Argus).

(4) Metal Deactivator

NAUGARD XL-1 (trade name, manufactured by Uniroyal), MARK CDA-1 (trade name, manufactured by Adeca Argus), MARK CDA-6 (trade name, manufactured by Adeca Argus), IRGANOX MD-1024 (trade name, manufactured by Ciba Geigy), and CUNOX (trade name, manufactured by Mitsui Toatsu).

Preferred antioxidants are the phenol-based ones, and particularly the hindered phenol-based ones. Commercially available preferred antioxidants include IRGANOX series products of Ciba Geigy, SUMILIZER BHT, SUMILIZER BH-76, SUMILIZER WX-R and SUMILIZER BP-101 of Sumitomo Chemical Co., Ltd.

It is effective to use one or more, particularly two or more of 2,6-di-tert-butyl-p-cresol (BHT), a low-volatile and high molecular weight hindered phenol-based antioxidant (e.g., IRGANOX 1010, IRGANOX 1076, TOPANOL CA, IONOX 330, all trade names), dilauryl thiodipropionate, distearylthiopropionate and dialkyl phosphate in combination. Since antioxidant is a reducing agent which adversely affects photographic materials, it is necessary to carefully examine its type and the compounding amount so that its preventing effect against thermal decomposition may be well-balanced in consistency with the photographic properties. In view of this, it is preferable to use phosphorus-based and phenol-based antioxidants, and more preferably hindered phenol-based antioxidants, because these have not much unfavorable influence on the photographic film, such as fogging and disordering of photosensitivity. Among the hindered phenol-based antioxidants, preferred ones have a melting point of 100° C. or higher, and particularly 120° C. or higher. It is most preferable to use two or more of the above-described phenol-based and phosphrus-based antioxidants in combination.

In particular, the antioxidant action is synergistically activated by light-shielding agents such as carbon black. It is preferable to use the above-described phenol-based and phosphorus-based antioxidants in combination with carbon black in view of the high effect of antioxidant action.

In addition, it is possible to select antioxidants disclosed in:

*Plastic Data Handbook*, published by Kogyo Chosakai Publishing Co., Ltd., Tokyo, pp. 794–799;

*Plastic Additives Data*, issued by K.K. Kagaku Kogyo Sha, pp. 327–329; and

*Plastics Age Encyclopedia, Advanced Version* (1986), issued by K.K. Plastic Age, pp. 211–212.

The following description relates to avoiding harmful influence of the above-described antioxidants on photographic films. In general, oxidative destruction of thermoplastic resin is the higher according to the number of ramifications of $CH_3$ in the resin. This is because the more oxygen is absorbed in the resin.

It is assumed that hydrocarbon is automatically oxidized once a free radical is generated by dehydration in the presence of oxygen, according to chain reaction of the following formulas:

1) $RH \rightarrow R\cdot$
2) $R\cdot + O_2 \rightarrow RH \rightarrow ROO\cdot$
3) $ROO\cdot + RH \rightarrow ROOH + R\cdot$
4) $ROOH \rightarrow RO\cdot + OH$
5) $RO\cdot + RH \rightarrow ROH + R\cdot$
6) $\cdot OH + RH \rightarrow HOH + R\cdot$ Thus, the oxidation of hydrocarbon is accelerated to produce a great quantity of alcohols, aldehydes, acids and the like, and they react with each other to produce polymer.

In order to prevent oxidation of hydrocarbon, it is necessary to intercept the chain reaction noted above. Antioxidant is used for this purpose. In alternative, it is preferable to load radial scavenger as set forth below.

Examples of the radical scavenger include 1,1-diphenyl-2-picrylhydrazyl, 1,3,5-triphenylferdazyl, 2,2,6,6-tetramethyl-4-piperidone-1-oxyl, N-(3-N-oxyanilino-1,3-dimethylbutylidene)-aniline oxide, a high valency metal salt such as ferric chloride, diphenylpicrylhydrazine, diphenylamine, hydroquinone, tert-butyl catechol, dithiobenzoyldisulfide, p,p'-ditolyltrisulfide, benzoquinone derivative, nitro compound and nitroso compound. Among these, hydroquinone is preferred the most. The above-described radical scavengers may be used either alone or in combination of several kinds. Compounding amount of radical scavenger may be from 1,000 ppm to 10,000 ppm.

As the antioxidant, there are radical chain terminator and peroxide decomposer. The former reacts with free radical groups, mainly $ROO\cdot$, which are chain carriers, to inactivate them. The latter decomposes hydroperoxide $ROOH$ which is the main source of free radical groups, to stabilize it.

The radical chain terminator includes alkylphenol antioxidant and aromatic amine antioxidant. The peroxide decomposer includes sulfur-containing antioxidant and phosphorus-containing antioxidant.

Antioxidant is reducer adversely affecting photographic film. Should its type and the compounding amount be unsuitable, degradation of photographic film would occur.

Examples of the antistatic agent preferably loaded in the opaque thermoplastic resin for use in the invention are described below.

I. Nonionic (1) Alkylamine derivatives

T-B103 (trade name, manufactured by Matsumoto Yushi), and T-B104 (trade name, manufactured by Matsumoto Yushi);

Alkylamide types: Polyoxiyethylene alkylamine: Armostat 310 (trade name, manufactured by Lion Fat & Oil), Tertiary amine (laurylamine): Armostat 400 (trade name, manufactured by Lion Fat & Oil), N,N-bis(2-hydroxyethylcocoamine): Armostat 410 (trade name, manufactured by Lion Fat & Oil), Tertiary amine: ANTISTATIC 273C, 273 and 273E (trade name, manufactured by Fine Org. Chem.), N-hydroxyhexadecyl-di-ethanol-amine: Belg. P. 654,049, and N-hydroxyoctadecyl-di-ethanol-amine: National Dist.

(2) Fatty acid amide derivatives

TB-115 (trade name, manufactured by Matsumoto Yushi), Elegan P100 (trade name, manufactured by Nippon Oils & Fats), and Erik SM-2 (trade name, manufactured by Yoshimura Yukagaku);

Hydroxystearic amide, Oxalic-N,N'-distearylamidebutylester (manufactured by Hoechst), and Polyoxyethylenealkylamide.

(3) Ether types

Polyoxyethylenealkylether $RO(CH_2CH_2O)_nH$, and Polyoxyethylenealkylphenyl ether;

Special nonionic types: Resistat 104, PE100, 116–118, PE 132 and 139 (trade name, manufactured by Dai-ichi Kogyo Seiyaku), Elegan E115, Chemistat 1005 (trade names, manufactured by Nippon Oils & Fats), Erik BM-1 (trade name, manufactured by Yoshimura Yukagaku), and Electrostripper TS, TS 2, 3, 5, EA, EA2 and 3 (trade name, manufactured by Kao Soap).

(4) Polyhydric alcohol ester types

Glycerine fatty acid ester: mono-, di- or triglyceride of stearic acid or hydroxystearic acid, monoglyceride (manufactured by Nippon Shono), TB-123 (trade name, manufactured by Matsumoto Yushi), and Resistat 113 (trade name, manufactured by Daiichi Kogyo Seiyaku). Sorbitan fatty acid ester;

Special ester: Erik BS-1 (trade name, manufactured by Yoshimura Yukagaku), 1-Hydroxyethyl-2-dodecylglyoxazoline (manufactured by British Cellophane).

II. Anionic (1) Sulfonic acids

Alkylsulfonate, $RSO_3Na$, Alkylbenzenesulfonate, Alkylsulfate, and $ROSO_3Na$.

(2) Phosphoric ester type

Alkyl phosphate.

III. Cationic (1) Amide type cation

Resistat PE300, 401, 402, 406 and 411 (trade name, manufactured by Dai-ichi Kogyo Seiyaku).

(2) Quaternary ammonium salts

Quaternary ammonium chloride, Quaternary ammonium sulfate, and Quaternary ammonium nitrate;

Catimin CSM-9(trade name, manufactured by Yoshimura Yukagaku), CATANAC 609 (trade name, manufactured by American Cyanamide), Denon 314C (trade name, manufactured by Marubishi Yuka), Armostat 300 (trade name, manufactured by Lion Fat & Oil), 100V (trade name, manufactured by ARMOR), Electrostripper ES (trade name, manufactured by Kao Soap), and Chemistat 2009A (trade name, manufactured by Nippon Oils & Fats);

Stearamido propyl-dimethyl-β-hydroxyethyl ammonium nitrate: CATANAC-SN (trade name, manufactured by American Cyanamide).

IV. Ampho-ionic (1) Alkylbetaine type (2) Imidazoline types

Leostat 53 and 532 (trade name, manufactured by Lion Fat & Oil), AMS 53, 303 and 313 (trade name, manufactured by Lion Fat & Oil); Alkylimidazoline type.

(3) Metal salt types

AMS 576 (trade name, manufactured by Lion Fat & Oil) Leostat 826 and 923 (trade name, manufactured by Lion Fat & Oil) $(RNR'CH_2CH_2CH_2NCH_2COO)_2Mg$ (manufactured by Lion Fat & Oil) wherein $R \geq C$, $R'=H$ or $(CH_2)_mCOO-$, $R=C_{3-N}$ hydrocarbon, A=oxygen or an imino group, and M=organic amine or a metal.

(4) Alkyl alanine type

V. Electroconductive Resin

Polyvinylbenzyl type cation, and Polyacrylic acid type cation.

VI. Others

Resistat 204 and 205 (trade name, manufactured by Daiichi Kogyo Seiyaku), Elegan 2E and 100E (trade name, manufactured by Nippon Oils & Fats), Chemistat 1002, and 2010 (trade name, manufactured by Nippon Oils & Fats), Erik 51 (trade name, manufactured by Yoshimura Yukagaku), and ALROMINE RV-100 (trade name, manufactured by Geigy).

Among the above-described antistatic agents, the nonionic antistatic agent is particularly preferred due to small harmful influence on photographic properties and human body.

The total addition amount of two or more antistatic agents is preferably from 0.001 wt. % to 5.0 wt. %, and more preferably from 0.005 wt. % to 3.0 wt. %. If the addition amount should be less than 0.001 wt. %, the addition effect of antioxidant action and smoothness is not satisfactory and only cost for kneading increase. On the other hand, if the addition amount should exceed 5.0 wt. %, slipping between the melted resin and the screw of the molding machine is readily caused and the ejection amount of resin becomes unstable. Further, blocking or bleeding out is liable to occur by aging after molding. Thickness of a layer is likely to have deviation.

It is possible in the present invention to add various additives as required to the resin. Examples of the additives are as follows.

1) Plasticizer: phthalate ester, glycol ester, fatty acid ester, and phosphate ester.

2) Stabilizer: lead type, cadmium type, zinc type, alkali earth metal type, and organotin type.

3) Flame retardant: phosphate ester, halogenated phosphate ester, halide, inorganic matters, and phosphorus-containing polyol.

4) Filler: alumina, kaolin, clay, calcium carbonate, mica, talc, titanium oxide, and silica.

5) Reinforcer: glass roving, metal fiber, glass fiber, milled glass fiber, and carbon fiber.

6) Foaming agent: inorganic foaming agents (ammonium carbonate and sodium bicarbonate), and organic foaming agents (nitroso type and azo type).

7) Vulcanizer: vulcanizing accelerator, and supplement accelerator.

8) Deterioration inhibitor: ultraviolet light absorber, metal inactivation agent, and peroxide decomposer.

9) Coupling agent: silane type, titanate type, chrome type, and aluminum type.

10) Various thermoplastic resins, thermoplastic elastomer, and rubber.

11) Antioxidant (0.001–1.0 wt. %) as referred to above.

Although the present invention has been fully described by way of the preferred embodiments thereof with reference to the accompanying drawings, various changes and modifications will be apparent to those having skill in this field without departing from the scope of the present invention.

What is claimed is:

1. A photo film cassette containing photo film in a cassette shell in a form of a roll, wherein said photo film is advanced to an outside of said cassette shell when a spool core is rotated in a direction of unwinding said photo film, said photo film cassette comprising:

first and second flanges, which are flexible and secured respectively to first and second axial ends of said spool core, for regulating positions of edges of said photo film, first and second circular bearing holes being formed respectively in a middle of said first and second flanges, and through which said spool core is inserted, said first bearing hole having a first diameter;

at least one ring-like lip, formed integrally with a periphery of at least one of said first and second flanges, said ring-like lip being projected toward said roll of said photo film and contacted on an edge of an outermost turn of said roll for preventing said roll from being loosened;

a first stopper ring, disposed near said first axial end of said spool core, projected from said spool core in radial fashion, and contacted on an edge of said first bearing hole in said first flange supported in a receiving region of said spool core, for preventing said first flange from being moved away from said receiving region and toward said first axial end, said first stopper ring having a second diameter;

a second stopper ring, disposed opposite to said first stopper ring in relation to said receiving region, projected from said spool core in radial fashion, and contacted on said edge of said first bearing hole in said first flange supported in said receiving region, for preventing said first flange from being moved away from said receiving region and toward said second axial end, wherein said first flange is moved past said second stopper ring toward said first axial end to be mounted on said receiving region;

a circumference of said spool core including at least first and second sections;

said second stopper ring including:

a first sector portion, disposed in said first section about said spool core, and having a third diameter greater than said first diameter; and a second sector portion, disposed in said second section about said spool core, and having a fourth diameter greater than said third diameter, said fourth diameter being smaller than said second diameter of said first stopper ring.

2. A photo film cassette as defined in claim 1, wherein said first flange is moved past said second axial end of said spool core and then toward said receiving region, before being mounted.

3. A photo film cassette as defined in claim 2, further comprising:

an indicator plate, disposed on said first axial end, for indicating information, said indicator plate being greater than said second stopper ring; and an indicator opening, formed in a face of said cassette shell where said first axial end is positioned, for causing said indicator plate to emerge.

4. A photo film cassette as defined in claim 3, wherein said third diameter is 1.013–1.03 times as great as said first diameter, and said fourth diameter is 1.03–1.046 times as great as said first diameter.

5. A photo film cassette as defined in claim 4, wherein said third diameter is 1.02 times as great as said first diameter, and said fourth diameter is 1.04 times as great as said first diameter.

6. A photo film cassette as defined in claim 4, wherein said second stopper ring further includes an inclined face formed on a farther side from said receiving region, for guiding movement of said first flange past said first and second sector portions toward said receiving region, to be mounted on said receiving region.

7. A photo film cassette as defined in claim 6, further comprising a recess, formed in said second sector portion.

8. A photo film cassette as defined in claim 6, wherein said first sector portion extends farther from said receiving region than said second sector portion.

9. A photo film cassette as defined in claim 8, wherein said circumference of said spool core further includes third and fourth sections;

further comprising:

a third sector portion, disposed in said third section about said spool core, and in rotationally symmetrical fashion to said first sector portion; and a fourth sector portion, disposed in said fourth section about said spool core, and in rotationally symmetrical fashion to said second sector portion.

10. A photo film cassette as defined in claim 9, wherein said first and third sections have respective central angles that are greater than a right angle and smaller than a straight angle.

11. A photo film cassette as defined in claim 10, further comprising a portion having a diameter which is gradually changed, said portion being disposed between one of said first and second sector portions, between said second and third sector portions, between said third and fourth sector portions, and between said fourth and first sector portions.

12. A photo film cassette as defined in claim 11, wherein said second and fourth sections have respective central angles that are smaller than a right angle.

13. A photo film cassette as defined in claim 12, wherein said second and fourth sections have respective said central angles of 4–45 degrees.

14. A photo film cassette as defined in claim 1, wherein said photo film includes:

a trailer secured to said spool core; and at least one retaining hole, formed in said trailer;

said photo film cassette further comprising:

a passage port which is formed in said cassette shell, and through which said photo film is passed to said outside;

a slot, formed in said spool core, extended in a longitudinal direction thereof, for inserting said trailer, said slot having first and second walls;

at least one retaining claw, formed inside said slot to project from said first wall, fitted in said retaining hole, for retaining said trailer in said slot;

a retaining face, formed on said retaining claw, confronted in a rotational direction of winding said photo film about said spool core, for preventing said trailer from moving toward said passage port when said photo film is unwound;

a support face, formed on said first wall and in connection with said retaining face, and disposed in an angular V-shape relative to said retaining face, said support face meeting $$3° \leq \theta5° \leq 20°$$

where θ5 is an angle at which said support face is inclined in said winding rotational direction relative to a first line, said first line being defined by said trailer extended between said spool core and said passage port when said photo film is unwound substantially entirely; and at least one resilient contact ridge formed inside said slot to project from said second wall for preventing said trailer from removal from said retaining claw.

15. A photo film cassette as defined in claim 14, wherein said support face lies within a range between said first line and a second line which is substantially parallel to said first line and 0.1–0.7 mm distant from said first line in said winding rotational direction.

16. A photo film cassette as defined in claim 15, wherein said contact ridge is movable away from said first wall.

17. A photo film cassette including a spool core, photo film having a trailer secured to said spool core and being wound on said spool core in a form of a roll, and a cassette shell for containing said spool core and said roll of said photo film in rotatable fashion, wherein said photo film is advanced to an outside of said cassette shell through a passage port when said spool core is rotated in a direction of unwinding said photo film, said photo film cassette comprising:

a slot, formed in said spool core, extended in a longitudinal direction thereof, for inserting said trailer, said slot having first and second walls;

said photo film including at least one retaining hole, formed in said trailer;

at least one retaining claw, formed inside said slot to project from said first wall, fitted in said retaining hole, for retaining said trailer in said slot;

a retaining face, formed on said retaining claw, confronted in a rotational direction of winding said photo film about said spool core, for preventing said trailer from moving toward said passage port when said photo film is unwound;

a support face, formed on said first wall and in connection with said retaining face, and disposed in an angular V-shape relative to said retaining face, said support face meeting $$3° \leq \theta5 \leq 20°$$

where θ5 is an angle at which said support face is inclined in said winding rotational direction relative to a first line, said first line being defined by said trailer extended between said spool core and said passage port when said photo film is unwound substantially entirely; and at least one resilient contact ridge, formed inside said slot to project from said second wall, for preventing said trailer from removal from said retaining claw.

18. A photo film cassette as defined in claim 17, wherein said support face lies within a range between said first line and a second line which is substantially parallel from said first line and 0.1–0.7 mm distant from said first line in said winding rotational direction.

19. A photo film cassette as defined in claim 18, wherein said contact ridge is movable away from said first wall.

* * * * *